(12) United States Patent
Kim

(10) Patent No.: US 8,345,693 B1
(45) Date of Patent: Jan. 1, 2013

(54) COOPERATIVE SPATIAL MULTIPLEXING

(75) Inventor: Sang Wu Kim, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 1682 days.

(21) Appl. No.: 11/405,858

(22) Filed: Apr. 18, 2006

Related U.S. Application Data

(60) Provisional application No. 60/672,757, filed on Apr. 19, 2005.

(51) Int. Cl.
*H04L 12/28* (2006.01)
(52) U.S. Cl. ........................................................ 370/400
(58) Field of Classification Search .................. 370/315; 455/7, 13.1
See application file for complete search history.

(56) References Cited

U.S. PATENT DOCUMENTS

| | | | |
|---|---|---|---|
| 5,345,599 A | 9/1994 | Paulraj et al. | |
| 6,067,290 A * | 5/2000 | Paulraj et al. | 370/329 |
| 7,035,240 B1 * | 4/2006 | Balakrishnan et al. | 370/338 |
| 2002/0114332 A1 * | 8/2002 | Apostolopoulos et al. | 370/392 |
| 2003/0124976 A1 * | 7/2003 | Tamaki et al. | 455/15 |
| 2003/0169720 A1 * | 9/2003 | Sebastian et al. | 370/342 |
| 2004/0165675 A1 * | 8/2004 | Ito et al. | 375/267 |
| 2004/0266339 A1 * | 12/2004 | Larsson | 455/7 |
| 2005/0232183 A1 * | 10/2005 | Sartori et al. | 370/319 |
| 2007/0160014 A1 * | 7/2007 | Larsson | 370/338 |
| 2007/0217432 A1 * | 9/2007 | Molisch et al. | 370/400 |
| 2008/0075033 A1 * | 3/2008 | Shattil | 370/328 |
| 2008/0165720 A1 * | 7/2008 | Hu et al. | 370/315 |
| 2008/0268907 A1 * | 10/2008 | Senarath et al. | 455/561 |
| 2009/0017753 A1 * | 1/2009 | Kim et al. | 455/10 |
| 2009/0316763 A1 * | 12/2009 | Erkip et al. | 375/211 |

OTHER PUBLICATIONS

Andreas Darmawan, "Cooperative Spatial Multiplexing System", Apr. 21, 2004, Thesis document published by Iowa State University, pp. 1-37, Web Address: http://archives.ece.iastate.edu/archive/00000059/.*
3rd Generation Partnership Project 2 "3GPP2", Physical Layer Standard for cdma2000 Spread Spectrum Systems, Release C, 3GPP2 C.S0002-C, Version 1.0, Dated May 28, 2002.
Akyildiz, I.F., et al., Accepted from Open Call, "A Survey on Sensor Networks", IEEE Communications Magazine, Aug. 2002.
Andrews, J.G., et al., "Optimum Power Control for Successive Interference Cancellation With Imperfect Channel Estimation", IEEE Transactions on Wireless Communications, Vo. 2(2), pp. 375-383, Mar. 2003.
Boyer, J., et al., "Multihop Diversity in Wireless Relaying Channels", IEEE Transactions on Communications, vol. 52(10), pp. 1820-1830, Oct. 2004.
Chandrakasan, A., et al., Design Consideration for Distributed Microsensor Systems, Dept. of EECS, Massachusetts Institute of Technology, Cambridge, MA.

(Continued)

*Primary Examiner* — Otis L Thompson, Jr.
(74) *Attorney, Agent, or Firm* — McKee, Voorhees & Sease, P.L.C.

(57) ABSTRACT

A cooperative spatial multiplexing scheme in which the transmitter (source), equipped with a single antenna, forms virtual antenna arrays from a collection of distributed antennas belonging to different wireless terminals, and transmit a high-rate data stream to those terminals (relays). Each relay detects only a subset (called sub-stream) of the data stream and all relays forward their sub-streams simultaneously over the same physical channel. Then the receiver (destination) nulls and cancels the interference from different relays in order of the magnitude of log-likelihood ratio and detects the signal transmitted from the source.

30 Claims, 12 Drawing Sheets

OTHER PUBLICATIONS

Chong, C., et al., "Sensor Networks: Evolution, Opportunities, and Challenges", Proceedings of the IEEE, vol. 91(8), pp. 1247-1256.

Cui, S., et al., "Energy-efficiency of MIMO and Cooperative MIMO Techniques in Sensor Networks", IEEE Journal on Selected Areas in Communications, 2004, pp. 1-10.

Foschini, G., et al., "On Limits of Wireless Communications in a Fading Environment When Using Multiple Antennas", Wireless Personal Communications 6:311-335, 1998.

Gesbert, D., "From Theory to Practice: An Overview of MIMO Space-Time Coded Wireless Systems", IEEE Journal on Selected Areas in Communications, vol. 21(3), pp. 281-301, Apr. 2003.

Gozali, R., et al., "The Impact of Multiuser Diversity on Space-Time Block Coding", IEEE Comm. Letters, pp. 213-215, May 2003.

Heath, R.W., et al., "Multiuser diversity for MIMO Wireless Systems with Linear Receivers", IEEE Conf. Signals, Systems and Computers, vol. 2, pp. 1194-1199, Nov. 2001.

Hunter, T.E., et al., "Diversity through Coded Cooperation", IEEE Transactions on Wireless Communications vol. 5(2), pp. 1-7, Feb. 2006.

Intanagonwiwat, C., et al., "Impact of Network Density on Data Aggregation in Wireless Sensor Networks", Proc. Int'l. Conf. Distributed Computing Systems (ICDCS), Jul. 2002.

Kim, S.W., Log-Likelihood Ratio based Detection Ordering for the V-BLAST, GLOBECOM 2003, pp. 292-296.

Laneman, J.N., et al., "An Efficient Protocol for Realizing Cooperative Diversity in Wireless Networks", ISIT2001, Washington, DC, Jun. 24-29, 2001, p. 294.

Laneman, J.N., et al., "Cooperative Diversity in Wireless Networks: Efficient Protocols and Outage Behavior", IEEE Trans. Inform. Theory (Accepted for Publication).

Nosratinia, A., et al., Cooperative Communication in Wireless Networks, Adaptive Antennas and MIMO Systems for Wireless Communications, IEEE Communications Magazine, pp. 74-80, Oct. 2004.

Pabst, R., et al., "Relay-Based Deployment Concepts for Wireless and Mobile Broadband Radio", IEEE Communications Magazine, pp. 80-89, Sep. 2004.

Pan, J., et al., "Locating Base-Station for Video Sensor Networks", IEEE Vehicular Technology Conference, Oct. 2003, pp. 3000-3004.

Paulraj et al., "Space time processing for wireless communications", IEEE Signal Processing Mag., vol. 14, pp. 49-83, Nov. 1997.

Paulraj, A.J., et al., "An overview of MIMO Communications—a Key to Gigabit Wireless", Proceedings of the IEEE, pp. 198-218, vol. 92(2), Feb. 2004.

Sendonaris, A., et al., "Increasing Uplink Capacity via User Cooperation Diversity", ISIT 1998, Cambridge, MA, USA Aug. 16-21, p. 156.

Sendonaris, A., et al., "User Cooperation Diversity—Part II: Implementation Aspects and Performance Analysis", IEEE Transactions on Communications, vol. 51(11) 1939-1948, Nov. 2003.

Shakkottai, S., et al., "Cross-Layer Design for Wireless Networks", IEEE Commun. Magazine, vol. 41(41), pp. 74-80, Oct. 2003.

Simon, M., et al., "Improving Signal-to-Noise Ratio Estimation for Autonomous Receivers", IPN Progress Receivers, IPN Progress Report 42-159, Nov. 15, 2004.

Stark, W., et al., "Low Energy Wireless Communications Network Design", IEEE Wireless Communications, pp. 60-72, Aug. 2002.

Stefanov, A., et al., "Cooperative Space-Time Coding for Wireless Networks", ITW2003, Paris, France, Mar. 31-Apr. 4, 2003.

web pages from www.amazon.com: Embedded, Everywhere: A Research Agenda for Networked Systems of Embedded Computers (6 pages).

web pages from www.amazon.com: Error Control Systems for Digital Communication and Storage: Books: Stephen B. Wicker (7 pages).

* cited by examiner

COOPERATIVE SPATIAL MULTIPLEXING

CROSS-REFERENCE TO RELATED APPLICATIONS

This application claims priority under 35 U.S.C. §119 of a provisional application Ser. No. 60/672,757 filed Apr. 19, 2005, which application is hereby incorporated by reference in its entirety.

BACKGROUND OF THE INVENTION

The present invention relates to wireless communications and more particularly to cooperative communications. Future wireless communication environments are highly resource-constrained, offering a limited and tightly regulated spectrum. The energy supply on wireless terminals is usually limited, and, in many scenarios they must operate for many years without battery replacement. A promising approach to overcome such limitations is the use of multiple antennas both to transmit and receive information, which can provide a diversity gain as well as a multiplexing gain at no extra bandwidth or power consumption [1]-[7]. Although attractive, this option requires collocated antenna elements with antenna spacing of tens of wavelengths at the base station and up to a wavelength at the terminal. In many practical scenarios, space limitations at the terminal site make antenna spacing critical, a physical constraint that significantly limits the applicability of antenna arrays.

A series of recent papers has suggested a new form of diversity obtained from virtual antenna arrays consisting of a collection of distributed antennas belonging to different wireless terminals [8]-[14]. We refer to these types of communications as cooperative communications. With cooperative communications, the source broadcasts its data to both the relay and the destination.

The key property of such cooperative communications is that transmitted signals can, in principle, be received and processed by any node. Nodes can act as relays and help other nodes, either individually or in groups. Furthermore, nodes can create additional paths for a source-destination pair to increase diversity against fading and interference, and allow spatial multiplexing between other nodes. Despite the advantage of present day examples of cooperative communications, problems remain.

Wireless ad hoc networks consist of a number of terminals (nodes) communication on a peer-to-peer basis, without the assistance of centralized infrastructure. As the amount of energy required to communicate reliably over wireless channels increases rapidly with distance, multi-hop communication has been vastly favored over a long-range single-hop link in wireless ad-hoc networks. Energy efficiency is a key design objective in most of the research related to wireless ad-hoc networks because the nodes are energy constrained. However, besides energy efficiency, hardware complexity is another important aspect that needs to be taken into account when designing wireless ad-hoc networks.

Recently, cooperative relaying is gaining significant attention in this perspective. This approach employs several nodes as relays for an active source/destination pair and use multiple relay nodes as a virtual (or distributed) antenna array to realize space-time coding or MIMO system in a distributed fashion. To date, the cooperative relaying techniques have primarily been proposed to achieve diversity gains [1]-[10]. These approaches, known as cooperative diversity (C-DIV), can improve detection reliability; however, spectral efficiency (rate) is usually sacrificed for diversity gain (reliability). In particular, when high-rate data is being delivered to a destination, the hardware complexity and energy consumption on each relay node can be substantial because each relay needs to detect and forward a packet at the same rate as the source generates it.

SUMMARY OF THE INVENTION

Therefore, it is a primary object, feature, or advantage of the present invention to improve over the state of the art.

It is a further object, feature, or advantage of the present invention to provide for cooperative communications in a manner appropriate for high-rate data.

It is a further object, feature, or advantage of the present invention to provide for cooperative spatial multiplexing which only requires a source to have a single antenna.

Another object, feature, or advantage of the present invention is to provide for cooperative spatial multiplexing using a plurality of relay nodes, each requiring only a single antenna.

A still further object, feature, or advantage of the present invention is to provide for cooperative spatial multiplexing which is attractive in resource-constrained environments, offering limited spectrum, energy, and space.

Yet another object, feature, or advantage of the present invention is to provide for a cooperative spatial multiplexing scheme with performance that approaches that of a conventional multiplexing scheme.

A further object, feature, or advantage of the present invention is the provision of a cooperative spatial multiplexing scheme that is spectrally efficient.

A still further object, feature, or advantage of the present invention is to provide a method for cooperative spatial multiplexing that shifts the burden of the relay nodes to the resource-abundant destination while keeping relay nodes as simple as possible.

Yet another object, feature or advantage of the present invention is to reduce transmit power needs, particularly where transmit power is being supplied by batteries.

A further object, feature, or advantage of the present invention is to provide a cooperative spatial multiplexing scheme which can be used to extend battery life in mobile devices.

Yet another object, feature, or advantage of the present invention is to provide for increased cell coverage in a cellular system.

A still further object, feature, or advantage of the present invention is to provide benefits or advantages while the data rate remains essentially the same.

Yet another object, feature, or advantage of the present invention is to provide a system suitable for use in real-time applications such as voice or video.

A further object, feature, or advantage of the present invention is to provide a system which lowers the probability of outage in a mobile communication system.

A still further object, feature, or advantage of the present invention is to provide spatial multiplexing without requiring multiple antennas at the transmitter.

Another object, feature, or advantage of the present invention is to provide a method and system for communications appropriate for use in a wireless video sensor network.

Yet another object, feature, or advantage of the present invention is to provide a method and system for communications which is energy efficient.

A further object, feature, or advantage of the present invention is to provide a method and system for communications which does not require complex hardware.

One or more of these and/or other objects, features, or advantages of the present invention will become apparent from the specification and claims that follow.

According to one aspect of the present invention, a new cooperative relaying approach that enables high-rate throughput in energy, bandwidth, and hardware limited environments, such as in wireless ad hoc networks. The proposed relaying approach, hereafter referred to as cooperative spatial multiplexing (C-SM), takes the idea of "sub-stream relaying" and extends the main principal of BLAST architecture [11] to the context of cooperative networks. The basic idea is that a source broadcasts a data stream to N relay nodes, which detect and rebroadcast 1/N-th of the received data (called sub-stream) at correspondingly lower rates. At the destination, multiple receive antenna or RAKE fingers separate the sub-streams and reassemble them based on their spatial characteristics or spreading codes, respectively. Since each relay receives and transmits only 1/N-th of the data, the relay nodes can be kept simple. This is a major departure from existing C-DIV approaches.

Benefits of the C-SM approach of the present invention include:

Hardware and energy: Lowering the reception rate per relay node reduces the hardware complexity and energy needs for reception on the relay nodes. For example, when the source broadcasts a serial data stream, each relay needs to receive only 1/N-th of the time; it can be shut down by its receiver circuitry during the other durations.

Interference and synchronization: By lowering the transmission rate per relay node, the required signal-to-noise ration for a given BER can be reduced and the synchronization accuracy among relay nodes can be relaxed. The former leads to a reduction of transmit energy and consequently, a less interference to other nodes, and the latter simplifies the synchronization algorithm. Also, lowering the transmission rate can reduce the effect of inter-symbol interference due to multi-paths between the relay and destination.

Security: Additional security mechanisms can be provided in the physical layer, because a hacker must attack all of the relay nodes simultaneously in order to steal meaningful information.

According to one aspect of the invention, a method for cooperative spatial multiplexing is provided. The method includes broadcasting from a source having a single antenna to a plurality of relay nodes and a destination over a communication link. The method includes detecting at each of the relay nodes one of a plurality of substreams and simultaneously forwarding the substream from each relay node to a destination over the same physical antenna. Thus, the present allows for cooperative spatial communications where the transmitter at the source and the receiver at the relay each only require a single antenna.

According to another aspect of the invention, a method for cooperative spatial multiplexing to reduce burdens on a plurality of N relay nodes is disclosed. The method includes broadcasting from a source a $2^N$-ary symbol to the plurality of N relay nodes and a destination over a communications link, detecting at each of the relay nodes one of a plurality of substreams associated with the symbol, and simultaneously forwarding the substream from each relay node to the destination over the same physical channel. The source is preferably a transmitter with only a single antenna. The communication link can use any modulation schemes, including, but not limited to DPSK modulation or BPSK modulation. Preferably, the destination provides for canceling interference. One method for canceling interference from the relays is to cancel interference in the order of the magnitude of log-likelihood ratio.

According to another aspect of the present invention, a system for cooperative spatial multiplexing is disclosed. The system includes a transmitter having only a single antenna, a plurality of relays in operative communication with the transmitter, and a receiver in operative communication with each of the plurality of relays. Preferably the receiver is adapted to null and cancel interference from the plurality of nodes such as in order of the magnitude of the log-likelihood ratio.

DETAILED DESCRIPTION OF THE PREFERRED EMBODIMENT

The present invention is now described with respect to exemplary embodiments. The present invention is not to be limited to the specific disclosure provided herein as the present invention contemplates numerous variations as may be appropriate in particular environments or contexts. A first embodiment is discussed with respect to a generalized communications network using cooperative spatial multiplexing. A second embodiment is discussed with respect to a cooperative relaying architecture for wireless video sensor networks.

The present invention provides for a method and system for cooperative spatial multiplexing scheme. This method provides a form of multiplexing. Generally, multiplexing is the process of mixing multiple signals for transmission through a single channel. Here, the multiplexing is space-division multiplexing or spatial multiplexing. The channel is shared by concentrating individual signals in non-overlapping narrow beams. Spatial multiplexing splits a single user's data stream into multiple sub streams. According to the present invention, a scheme for spatial multiplexing uses a source in cooperation with a set of relays to form a virtual antenna array and transmits its symbol to the destination. The receiver nulls and cancels interference from different relays and detects the signals transmitted from the source. In other words, the basic idea is that a source broadcasts a data stream to N relay nodes, which detect and rebroadcast 1/N-th of the received data (called sub-stream) at correspondingly lower rates. At the destination, multiple receive antennas or RAKE fingers separate the sub-streams and reassemble them based on their spatial characteristics or spreading codes, respectively. Since each relay receives and transmits only 1/N-th of the data, the relay nodes can be kept simple.

There are numerous applications in which this scheme can be used, including in uplink (mobile unit to base station) transmissions and sensor networks where a source node can transmit the information symbol to the controller cooperating with the neighboring sensors forming a virtual array.

The present invention provides for one embodiment where the same type of modulation is used by the source and the relays (C-SM). In another embodiment, the source and relays use different modulation techniques or mixed modulation (C-SM-MM). In another embodiment, direct paths from the source to destination antennas are used to improve the performance of the C-SM-MM scheme (C-SM-MM with direct path). In another embodiment, performance is improved through the use of error correction coding as well as erasure coding.

System Model

Figure 1:
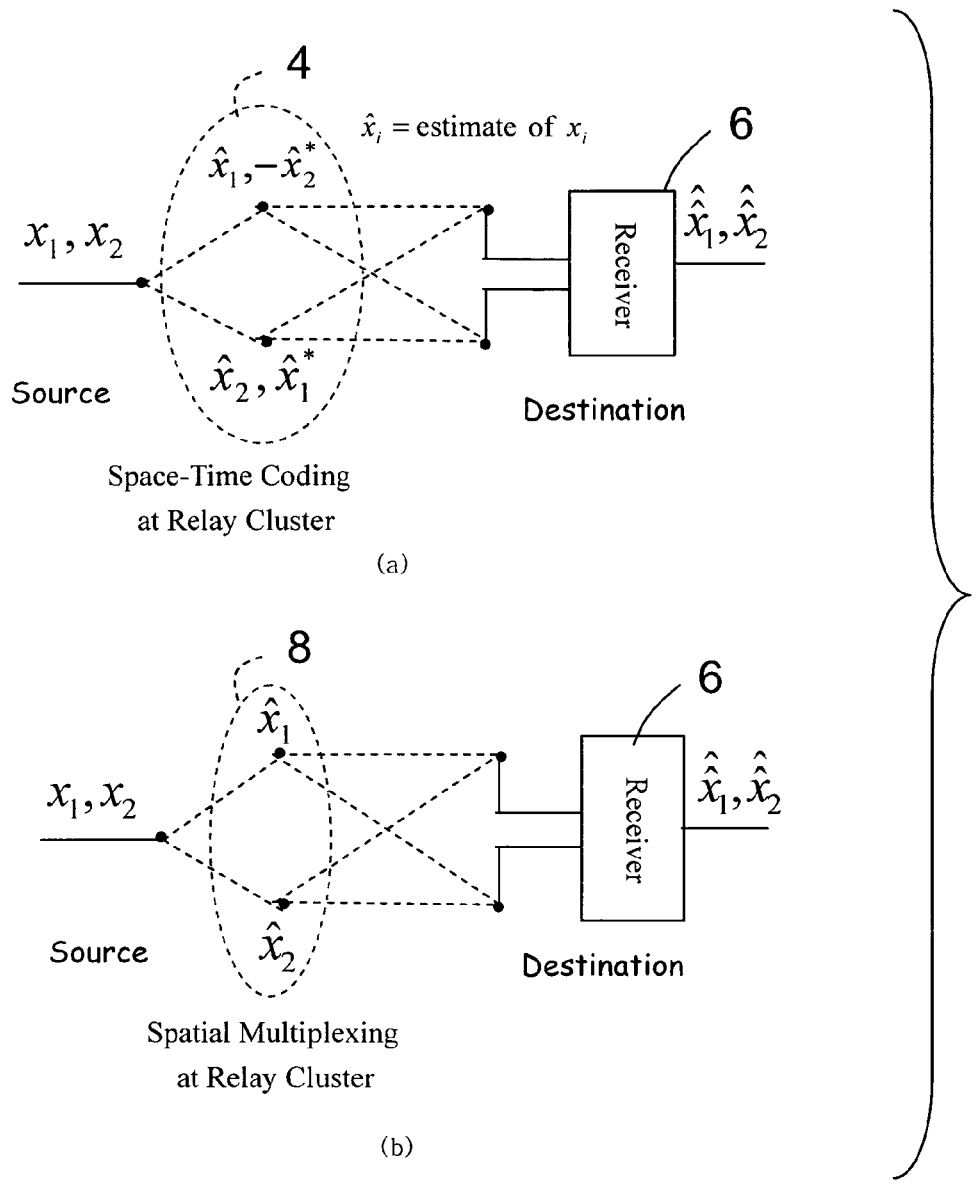
FIG. 1 is a diagram illustrating one embodiment of a cooperative spatial multiplexing system according to one embodiment of the present invention.

Because of the practical difficulty associated with antenna coupling, the source data symbol will be sent in two steps. In the first step, the source which is equipped with one antenna broadcasts a $2^N$-ary symbol x representing N bits $x_1, x_2, \ldots, x_N$ to N relays $R_1, R_2, \ldots, R_N$ with a symbol energy $E_s$, i.e. $E[|x|^2]=E_s$, at a rate of 1/T symbols per second, where $(x_1, \bar{x}_2, \ldots, x_N)$ is a binary representation of x. If the relay employs an M-ary signaling, then the required number of relays is N $\log_2$ M. We assume that the relay is equipped with one antenna. In the second step, the relay $R_i$ detects only $x_i$ and forwards its estimate to the destination with a symbol energy $E_r$, i.e. $E[|\hat{x}_i|^2]=E_r$, at a rate of 1/T symbols per second. At this step all relays forward their estimates simultaneously to the destination node over the same physical channel. The time synchronization among relay nodes can be obtained through periodical broadcast messages (beacon) from the source which can be used as a time reference. Then the total transmission energy per information bit, $E_b$, is $(E_s+NE_r)/N$. FIG. 1 shows a special case of N=4, where the dark circle represents the antenna and the dotted lines represent the wireless links. In FIG. 1, a source 2 is shown which is in wireless communication with a plurality of relays within the relay cluster 4 or 8 which in turn are in wireless communication with the receiver 6. Relay cluster 4 uses space-time coding at the relay cluster. Relay cluster 8 uses spatial multiplexing at the relay cluster.

The channel between the relay and the destination is assumed to be a rich-scattering wireless channel. The receiver (or destination), equipped with K($\geq$N) antennas, detects data $x_1 x_2 \ldots x_N$ using the V-BLAST algorithm: nulling, ordering, and cancellation. The proposed scheme differs from the conventional spatial multiplexing scheme [5] in so far as the source is assisted by virtual antenna arrays and the wireless link between the source and the relay experiences fading, noise, or interference so that the data detection at the relay can be wrong.

We assume that the total transmission power in the system $P_s+NP_r$ is held at a fixed value P. Increasing $P_s$ will increase the reliability of data detection at the relays, but it will allow for less power allocation at the relays, causing the detection at the destination less reliable. On the other hand, decreasing $P_s$ will allow for more power allocation at the relay but will decrease the reliability of data detection at the relays. So, we expect that there exists an optimal pair of $P_s$ and $P_r$ that minimizes the probability of error at the final destination. We also expect that the optimal power allocation on the source and relay depends on the location of the relays.

Signal Detection

The received signal $y_{R_i}$ at the relay $R_i$ is given by $$y_{R_i}=h_{r_i,s}x_i+n_{R_i} \quad i=1,2,\ldots,N \tag{1}$$

where $h_{R_i,S}$ is the channel gain between the source and the relay $R_i$, $x_i \in \{+\sqrt{E_S},-\sqrt{E_S}\}$ is the transmitted symbol from the source, and $n_{R_i,S}$ is the complex Gaussian noise with mean zero and variance $N_0/2$ per-dimension. We assume that $h_{R_i,S}$ is complex Gaussian distributed with mean zero and variance $E[|h_{R_i,S}|^2]=Ad_{R_i,S}^{-m}$, where $d_{R_i,S}$ is the distance between the source and relay $R_i$ and m is the path loss exponent, typically $2 \leq m \leq 5$ [13]. The constant A captures the effects of antenna gain and carrier frequency and is given by $$\left(\frac{4\pi d_0}{\lambda}\right)^{-2}$$

where, $\lambda$ is the wavelength of the propagating signal and $d_0$ is the reference distance (a point in the far field of the antenna) [13]. We will consider M-ary signaling later herein.

Similarly, the received signal $y_{D_j}$ at the $j^{th}$ receive antenna at the destination is given by $$y_{D_j} = \sum_{i=1}^{N} g_{D_j,R_i}\hat{x}_i + n_{D_j} \quad j=1, 2, \ldots, K \tag{2}$$

where $g_{D_j,R_i}$ is the channel gain between the relay $R_i$ and destination $D_j$, $\hat{x}_i \in \{+\sqrt{E_r},-\sqrt{E_r}\}$ is the estimation of $x_i$ at the relay $R_i$ and $n_{D_j}$ is the complex Gaussian noise with mean zero and variance $N_0/2$ per-dimension. With the maximum likelihood detection, $\hat{x}_i\sqrt{E_r}$ sgn($y_{R_i}$), where sgn(x) is 1 if x$\geq$0 and $-1$ if x<0. We assume that $g_{D_j,R_i}$ is a complex Gaussian random variable with mean zero variance $E[|g_{D_j,R_i}|^2]=Ad_{D_j,R_i}^{-m}$. Here $d_{D_j,R_i}$ is the distance between the relay $R_i$ and the destination D, and K($\geq$N) is the number of receive antennas at the destination. Then, the received vector at the destination $y_D[y_{D_1}, y_{D_2}, \ldots, y_{D_K}]^T$ can be expressed by $$y_D=G\hat{x}+n_D \tag{3}$$

where $$G = \begin{pmatrix} g_{11} & g_{12} & \cdots & g_{1N} \\ g_{21} & g_{22} & \cdots & g_{2N} \\ \vdots & \vdots & \ddots & \vdots \\ g_{K1} & g_{K2} & \cdots & g_{KN} \end{pmatrix} \quad (4)$$

$$\hat{x} = [\hat{x}_1, \hat{x}_2, \ldots, \hat{x}_N]^T \quad (5)$$

and $$n_D = [n_{D_1}, n_{D_2}, \ldots, n_{D_K}]^T \quad (6)$$

The destination can detect the data stream $x_1, x_2 \ldots x_N$ by nulling, ordering, and canceling the interference. We consider a new detection ordering based on the magnitude of log-likelihood ratio (LLR) in the iterative nulling and cancellation process [14]. The motivation for using the magnitude of LLR is that it provides an instantaneous information on the reliability of the maximum a posteriori probability (MAP) decision.

Let $$W = (G^H G)^{-1} G^H \quad (7)$$

$$= [w_1, w_2, \ldots, w_N]^T \quad (8)$$

where $w_i$ is a 1×K nulling vector. Then, the zero forcing yields $$W y_D = \hat{x} + W n_D \quad (9)$$

or $$z_i = \hat{x} + w_i n_D \quad (10)$$

where $w_i n_D$ is a complex Gaussian random variable with mean zero and variance $\|w_i\|^2 N_0/2$ per-dimension. Similarly, the minimum mean square error (MMSE) receiver can be employed for nulling, in which case $W = [G^H G + I/(E_r/N_0)] H^H$ The final decision $\hat{\hat{x}}_i$ on $x_i$ at the destination can be made based on $z_i$ using the maximum a posteriori (MAP) decision rule:

$$\hat{\hat{x}}_i = \underset{s_m}{\arg\max}\, P(x_i = s_m \mid z_i). \quad (11)$$

Then, we subtract $\hat{\hat{x}}_i g_i$ from $y_D$ to generate a modified received vector $y_D^{(1)}$ given by $$y_D^{(1)} = y_D - \hat{\hat{x}}_i g_i \quad (12)$$

and a modified channel matrix $$G^{(1)} = [g_1, \ldots, g_{i-1}, 0, g_{i+1}, \ldots, g_N] \quad (13)$$

where $g_i = [g_{1i}, g_{2i}, \ldots g_{Ki}]^T$. This process continues until all data streams are detected.

Detection Ordering

The performance is affected by the order in which the substreams are detected [11]. The original method detects the substream that presents the maximum SNR first and then cancels its contribution from the received signal. For the remaining symbols, the process is repeated by detecting the next strongest, and so on. A new ordering for interference cancellation based on the magnitude of log-likelihood ratio (LLR) may be used. The motivation for using the LLR magnitude is that it provides the reliability of maximum a posteriori (MAP) decision: LLR values near zero correspond to unreliable bits.

For binary signaling, the end-to-end BER for $x_i$, after knowing $z_i$ is given by $$P(\hat{\hat{x}}_i \neq x_i) = \frac{1}{1 + e^{|\Lambda(z_i)|}} \quad (14)$$

where $$\Lambda(z_i) = \ln \frac{P(x_i = +\sqrt{E_s} \mid z_i)}{P(x_i = -\sqrt{E_s} \mid z_i)} \quad (15)$$

is the LLR for $x_i$ given $z_i$. A detailed derivation of (11) is provided in [15]. Since the a posteriori BER decreases with increasing $|\Lambda(z_i)|$, we propose to cancel in order of $|\Lambda(z_i)|$. This will be referred to as LLR-ordered SIC.

The main difference of the LLR-based ordering from the SNR-based ordering is its dependence on the nulling filter outputs $z_i$, $i=1, 2, \ldots, N$. As a posteriori, $\{z_i\}$ provides additional information. Therefore, by intuition, the LLR-based ordering using this additional information will outperform the SNR-based ordering. Specifically, suppose that the k-th substream is detected first based on the SNR-ordering. Then since $$E_{z_1, z_2, \ldots, z_N} [\min_i P(\hat{\hat{x}}_i \neq x_i \mid z_i)] \leq E_{z_k} [P(\hat{\hat{x}}_k \neq x_k \mid z_k)] \quad (16)$$

the average BER of the first detected sub-stream based on the LLR-ordering will not be greater than that of the SNR-ordering. This will also reduce the error propagation in subsequent iterations. Since the first detected stream has the least diversity order, the overall BER is mainly determined by the BER of the first detected sub-stream. Hence, the LLR-based ordering will outperform the SNR-based ordering.

For our system model in (10), it can be shown that:

$$\Lambda(z_i) = \ln\left( \frac{e^{|\Lambda(y_{R_i})| + \Lambda(y_D)} + 1}{e^{|\Lambda(y_{R_i})|} + e^{\Lambda(y_D)}} \right) \quad (17)$$

$$\approx \begin{cases} \mathrm{sgn}(\Lambda(y_D)) \mid |\Lambda(y_D)|, & |\Lambda(y_{R_i})| \gg |\Lambda(y_D)| \\ \mathrm{sgn}(\Lambda(y_D)) \mid |\Lambda(y_{R_i})|, & |\Lambda(y_{R_i})| \ll |\Lambda(y_D)| \end{cases} \quad (18)$$

where $$\Lambda(y_{R_i}) = \ln \frac{P(x_i = +\sqrt{E_s/N} \mid y_{R_i})}{P(x_i = -\sqrt{E_s/N} \mid y_{R_i})} \quad (19)$$

$$= \ln \frac{\sum_{x=+\sqrt{E_s/N}} e^{-\|y_{R_i} - h_{R_i,s} x\|^2/N_0}}{\sum_{x=-\sqrt{E_s/N}} e^{-\|y_{R_i} - h_{R_i,s} x\|^2/N_0}} \quad (20)$$

is the LLR for $x_i$ at the i-th relay, and $$\Lambda(y_D) = \ln \frac{P(\hat{x}_i = +\sqrt{E_r/N} \mid z_i)}{P(\hat{x}_i = -\sqrt{E_r/N} \mid z_i)} \quad (21)$$

-continued $$= \frac{4\sqrt{E_r}}{N_0} \frac{\text{Re}\{z_i\}}{\|w_i\|^2} \quad (22)$$

is the LLR for $\hat{x}_i$ at the destination. An interesting tradeoff between the reliability for the source-to-relay link and that for the relay-to-destination link follows from (17). If there is no error at the i-th relay, i.e. $|\Lambda(y_{R_i})|=\infty$, then $\Lambda(z_i)=\Lambda(y_D)$. But if the reliability of detection at the relay is relatively low, i.e. $|\Lambda(y_{R_i})|\ll|\Lambda(y_D)|$, then it follows from (18) that the end-to-end reliability is governed by the reliability at the relay regardless of the channel quality between the relay and the destination. Therefore, it is important to maintain a high reliability for the source-to-relay link by properly allocating the power between the source and relays. When the power is properly allocated such that $|\Lambda(y_{R_i})|$ is maintained high, then the destination would not need to be informed of $|\Lambda(y_{R_i})|$ in determining the cancellation order because $\Lambda(z_i)\approx\Lambda(y_D)$.

Simulation results show that orderings based on $|\Lambda(y_D)|$ and $|\Lambda(z_i)|$ provide almost the same end-to-end BER when $E_s$ and $E_r$ are properly allocated. So, the LLR-ordered SIC will proceed in order of $|\Lambda(y_D)|$ in this example.

Extension to M-Ary Signaling

In this section we consider the case where $x_i$ and $\hat{x}_i$ are M-ary signal in the set $\{s_1, s_2, \ldots, s_M\}$. Let
Let $$\hat{x}_i = \arg\max_{s_m} P(x_i = s_m \mid z_i) \quad (23)$$

be the MAP decision for the $i^{th}$ symbol at the destination, and $$\Lambda_{i,m} = \ln\frac{P(x_i = \hat{x}_i \mid z_i)}{P(x_i = s_m \mid z_i)} \quad (24)$$

be the pairwise LLR. If the probability of symbol error at the relay, $P(\hat{x}_i \neq x_i)$ is less than ½, then it can be shown that $$\hat{x}_i = \arg\max_{s_m} P(\hat{x}_i = s_m \mid z_i) \quad (25)$$

and for equi-probable source $$\hat{x}_i = \arg\min_{s_m} |z_i - s_m|. \quad (26)$$

It follows from (24) and the equality $\Sigma_{m=1}^M P(x_i=s_m|z_i)=1$ that the conditional probability of symbol error given $z_i$ is $$P(x_i \neq \hat{x}_i \mid z_i) = 1 - \frac{1}{\sum_{m=1}^{M} e^{-\Lambda_{i,m}}}. \quad (27)$$

Since the conditional probability of symbol error decreases with decreasing $\Sigma_{m=1}^M e^{-\Lambda_{i,m}}$, we propose to cancel in order of $\Sigma_{m=1}^M e^{-\Lambda_{i,m}}$, i.e. cancel the symbol minimizing $\Sigma_{m=1}^M e^{-\Lambda_{i,m}}$ first. This will be referred to as the LLR-ordered SIC.

The pairwise LLR in (24) can be expressed as $$\Lambda_{i,m} = \ln\frac{P(\hat{x}_i = \hat{x}_i \mid z_i)(1 - 2P_{e,i}) + P_{e,i}}{P(\hat{x}_i = s_m \mid z_i)(1 - 2P_{e,i}) + P_{e,i}} \quad (28)$$

where $P_{e,i}$ is the probability of symbol error at the i-th relay, i.e. $P(\hat{x}_i \neq x_i)$. Assuming that $P_{e,i} \ll 1^3$ and source symbols are equi-probable, (28) can be approximated as $$\Lambda_{i,m} \approx \ln\frac{P(z_i \mid \hat{x}_i = \hat{x}_i)}{P(\hat{x}_i \mid z_i = s_m)} \quad (29)$$

$$= \left(|z_i - s_m|^2 - |z_i - \hat{x}_i|^2\right)/(\|w_i\|^2 N_0) \quad (30)$$

where the second equality follows from $$P(z_i \mid \hat{x}_i = s_m) = \frac{1}{\pi \|w_i\|^2 N_0} e^{-|z_i - s_m|^2/\|w_i\|^2 N_0} \quad (31)$$

For equi-probable and equi-energy signaling such as MPSK or MFSK, it can be shown from (27) and (30) that $$P\left(x_i \neq \hat{x}_i \mid z_i\right) \geq \frac{1}{1 + e^{2d_{min}|z_i|/(\|w_i\|^2 N_0)}} \quad (32)$$

where $d_{min}=\min_{s_i \neq s_j}|s_i-s_j|$. The lower bound in (32) is obtained by taking two dominant terms in the denominator of (27). Since $|z_i|/(\|w_i\|^2 N_0)$ is much simpler than $\Sigma_{m=1}^M e^{-\Lambda_{i,m}}$ in (27), the substreams can be cancelled in order of $|z_i|/\|w_i\|^2$. This will be referred to as the envelope (ENV)-ordered SIC, because $|z_i|$ is the envelope of $z_i$. Our numerical result shows that the ENV-ordered SIC performs almost the same as the LLR-ordered SIC.

Adaptive Forwarding and Coding

Cooperative relaying protocols can be fixed or adaptive. While in fixed protocols the relays constantly forward a processed version of their received signals, in adaptive versions the relays forward signals only when they believe it to be useful for the destination. The adaptation may be done by each relay independently or jointly for all together if information is exchanged between the relays. While availability of channel state information (CSI) at the relay allows for better performance, we will consider the scenario where the CSI is not available at the relay due to limited channel feedback and complexity.

Our approach is to forward only when the reliability of detection at the relay is above a threshold and, otherwise, stop forwarding signals. The reliability of detection at the relay can be measured in several ways. One common measure is the signal-to-noise ratio (SNR). As an alternative, one may consider the magnitude of log-likelihood ratio (LLR). Each relay determines whether to forward or not based on its own reliability of detection and those non-forwarded symbols can be treated as erasures at the destination and corrected by forward error correction (FEC) techniques [16]. The motivation for this type of adaptive forwarding is that if the reliability of detection at the relay is low then it is highly likely to be so at the destination. Since only local information (reliability of detection) is used in determining whether to forward or not, the adaptation can be implemented in a distributive way without exchanging information among relay nodes.

Reducing the effective number of sub-streams brings increased diversity gain, because the diversity gain increases with the differences between the number of receive antennas and that of transmitted sub-streams. Also, energy can be save by not forwarding unreliable symbols. Because the destination can measure the fading, it can determine which relays have not forwarded signals and, hence, can delete the corresponding column in the channel matrix. The presence of signal from a particular relay can be detected by estimating the SNR of zero-forcing (or MMSE) filter output, and several techniques are available for estimating the SNR, such as the one in [17].

In case some relays fail, the corresponding sub-streams will not be forwarded to the destination. As in the adaptive forwarding case, those non-forwarded symbols can be treated as erasures at the destination and corrected by FEC techniques. So, the system can be made robust to node failures.

Network Security

Each node in wireless and ad hoc networks represents a potential point of attack, making it impractical to monitor and protect each individual node from either physical or logical attack. By "a node is attacked" we mean a node is accessed and intruded without authorization. Particularly, in wireless ad hoc networks nodes may be dispersed over a large area, further exposing them to attackers who capture and reprogram individual nodes.

In the current C-DIV type relaying architecture the entire information can be accessed by attacking any one relay node, because the entire information is forwarded through each relay node. The current solutions to protect networks against such attacks are mostly applied in a hierarchical manner. In the network layer, firewalls are widely deployed. In higher layers, the protection is implemented by encryption technologies such as authentication protocols and digital signatures. However, achieving these goals on resource limited hardware, such as in mobile ad hoc networks, will require lightweight security protocols.

The proposed C-SM architecture can provide an additional security mechanism over traditional security provision mechanisms, because only a portion of the traffic is forwarded through each relay node. In order for an attacker to get the entire information, it should attack all relay nodes in the C-SM architecture. Hence, the probability PI that all of the information sent from the source is leaked out, called the intrusion probability is given by $$P_I = \prod_{i=1}^{N} p_i \qquad (33)$$

Where $p_i$ is the probability that the i-th relay node is attached. If $p_i = p$ for all i, then the intrusion probability is $p^N$ for the C-SM whereas for the C-DIV it is p. That is, the intrusion probability for C-SM is a monotonic decreasing function of N, hence making it more difficult to steal information.

Numerical Results and Discussions

In this section we present numerical results. In what follows, the system with N relays and K receive antennas will be denoted by N×K, and QPSK modulation for the source-relay link and BPSK modulation for the relay-destination link will be denoted by QPSK+BPSK.

Figure 2:
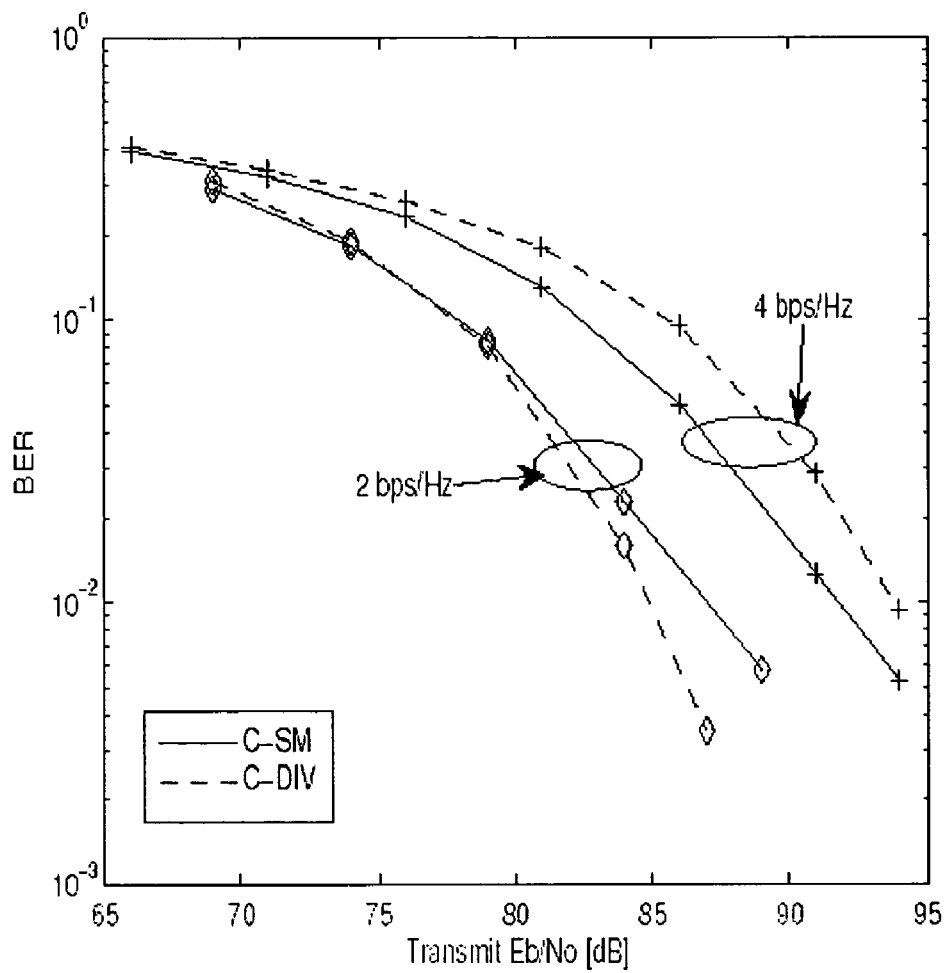
FIG. 2 is a graph illustrating BER versus total transmit energy per information bit to noise spectral density ratio, $E_b/N_0$; path loss exponent=4, $d_{S,D}$=100 m, $d_{S,R}$=10 m, according to one embodiment of the present invention.

FIG. 2 compares the end-to-end BER of the cooperative spatial multiplexing (C-SM) and cooperative diversity (C-DIV) approaches, both employing 2 relays and 2 receive antennas at the destination. The distance between the source and destination is 100 m, and the distance between the source and relay is 10 m. The C-SM employs MMSE detection with the LLR-ordered successive interference cancellation, whereas the C-DIV employs linear combining and ML detection. The BER for the C-DIV is obtained assuming that the same decision is made in all relays. However, in practice, each relay will make an independent decision, causing an inter-symbol interference when different decisions are made at different relay nodes. Therefore, the BER shown for the C-DIV is a lower bound. We find that the C-SM can provide a lower BER than the C-DIV at high spectral efficiency, where $E_b$ on the x-axis is the total transmit energy from both source and relays per information bit.

Figure 3:
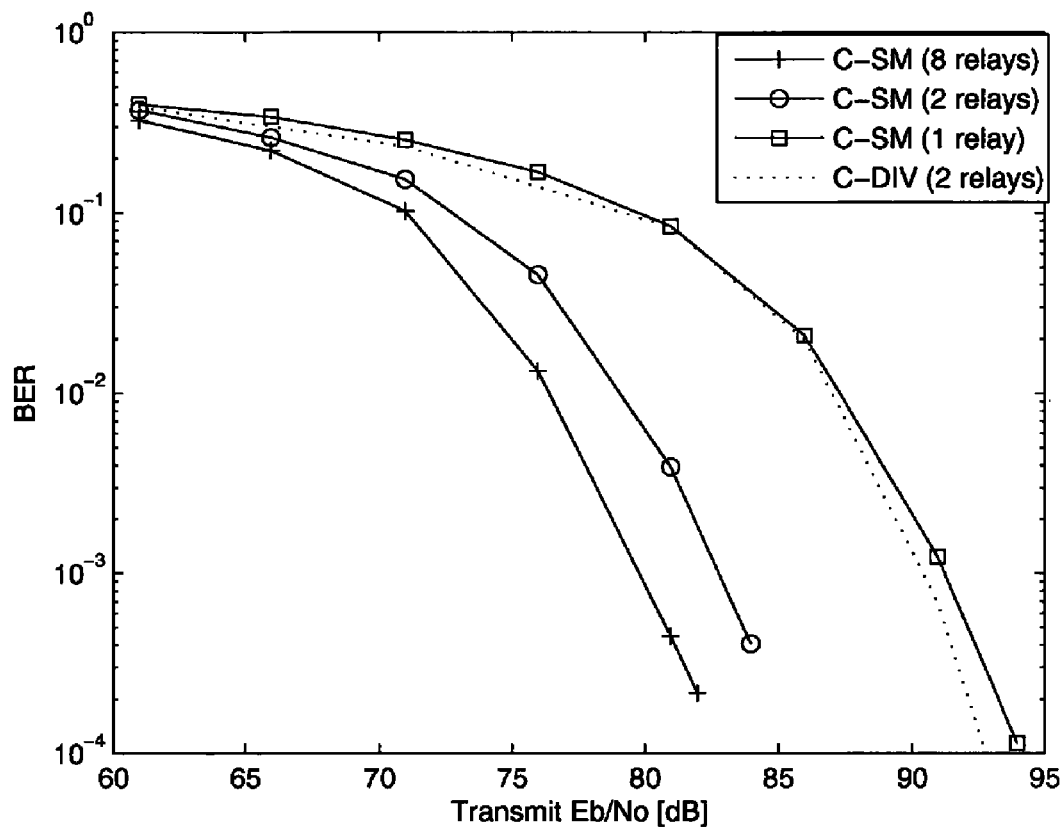
FIG. 3 is a graph illustrating BER versus total transmit energy per information bit to noise spectral density ratio, $E_b/N_0$; spectral efficiency=4 bps/Hz, path loss exponent=4, $d_{S,D}$=100 m, $d_{S,R}$=5 m, according to one embodiment of the present invention.

FIG. 3 compares the end-to-end BER of the C-SM and C-DIV approaches, both providing the spectral efficiency of 4 bps/Hz and employing 8 receive antennas at the destination. The distance between the source and destination is 100 m, and the distance between the source and relay is 5 m. At the source, both C-SM and C-DIV employ $2^8$-ary QAM. At the relay, the C-SM employs BPSK (8 relays) or 16-QAM (2 relays), whereas the C-DIV employs Alamouti-type space-time encoding with $2^8$-ary QAM at both relays. These constellation sizes are chosen to achieve the same spectral efficiency of 4 bps/Hz for all cases considered in this figure. We find that the C-SM can provide a significantly lower BER than the C-DIV for a given $E_b/N_0$, particularly when a low constellation size (e.g. BPSK) is employed at the relays. At the BER of $10^{-3}$ (uncoded) the C-SM provides a power gain of up to 10 dB over the C-DIV, which corresponds to extending the coverage by 78% for the same transmit energy.

Figure 4:
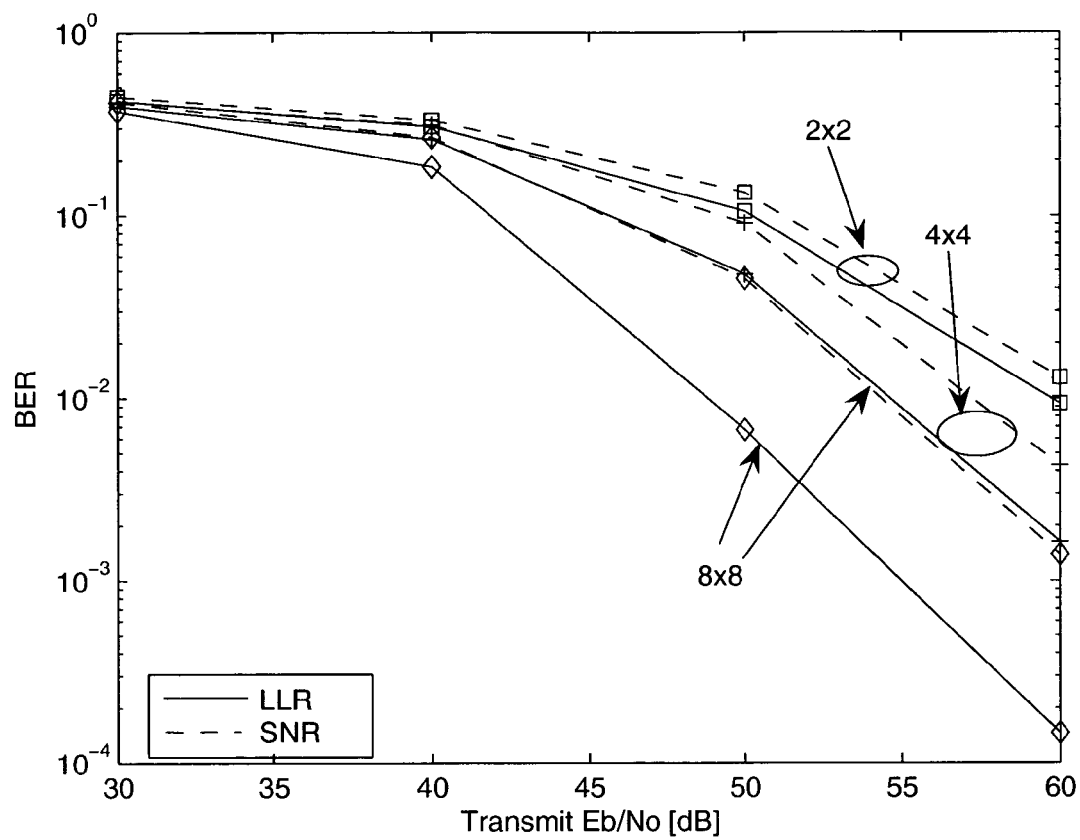
FIG. 4 is a graph illustrating BER versus transmit $E_b/N_0$ with SNR-ordered SIC and LLR-ordered SIC in cooperative spatial multiplexing scheme. The ZF, LLR-ordered SIC, path loss exponent=4, $d_{S,D}$=20 m, $d_{S,R}$=5 m, BPSK+BPSK, according to one embodiment of the present invention.

FIG. 4 compares the BER obtained by the SNR-ordered SIC and the LLR-ordered SIC for several numbers of relays and receive antennas. We find that the power gain provided by the LLR-ordered SIC over the SNR-ordered SIC increases with increasing number of relays. The BER with the LLR-ordered SIC and four relays (4×4) is virtually identical to that with the conventional SNR-ordered SIC and eight relays (8×8). This shows that the LLR-ordered SIC can significantly reduce the number of relays and receive antennas (system complexity), although there is a slight difference in the spectral efficiency of the two systems (4/5 bps/Hz for 4×4 vs. 8/9 bps/Hz for 8×8).

Figure 5:
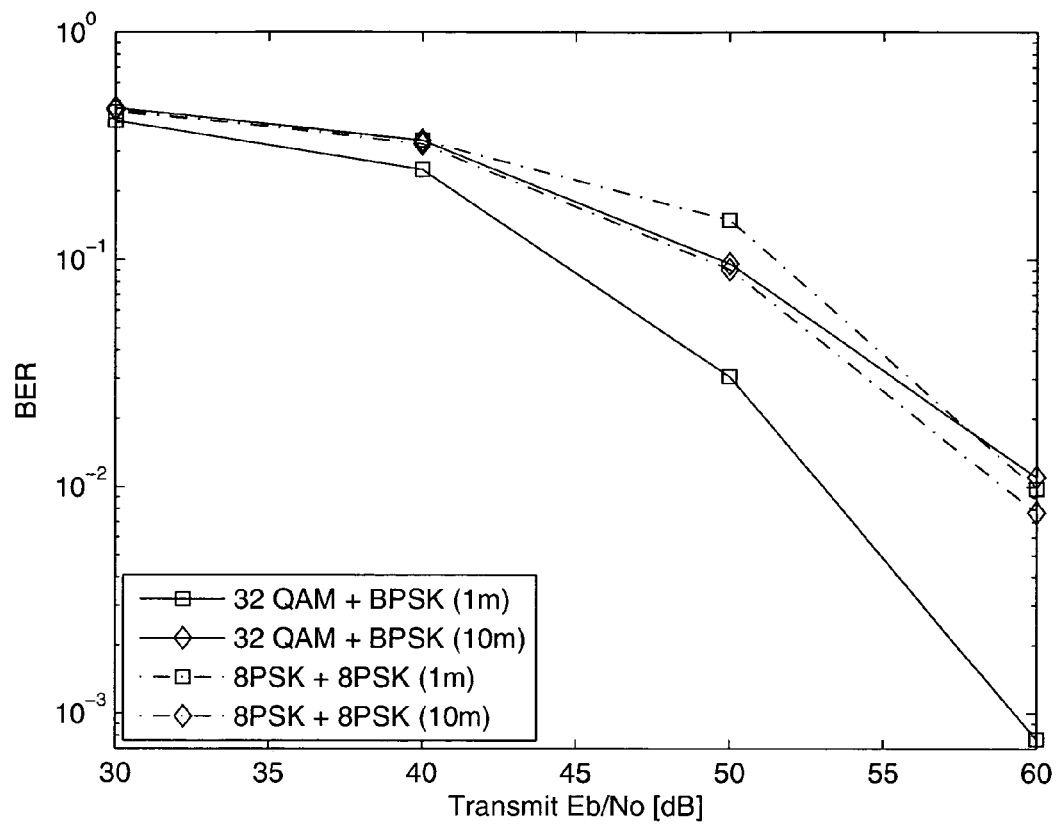
FIG. 5 is a graph illustrating a comparison of two modulation schemes in cooperative spatial multiplexing system; $d_{S,D}$=20 m, spectral efficiency=2.5 bps/Hz, path loss exponent=4, ZF, according to one embodiment of the present invention.

FIG. 5 compares two modulation schemes that achieve the same spectral efficiency of 2.5 bps/Hz. We find that when the relays are located close to the source, a higher order modulation at the source (32-QAM) and a lower order modulation at the relay (BPSK) provides a lower BER than the same order modulation (8-PSK) for both source and relays. However, when the relays are located far from the source, the latter can provide a lower BER. This is because the former provides a low reliability of detection at the relays when the relays are located far from the source.

Figure 6:
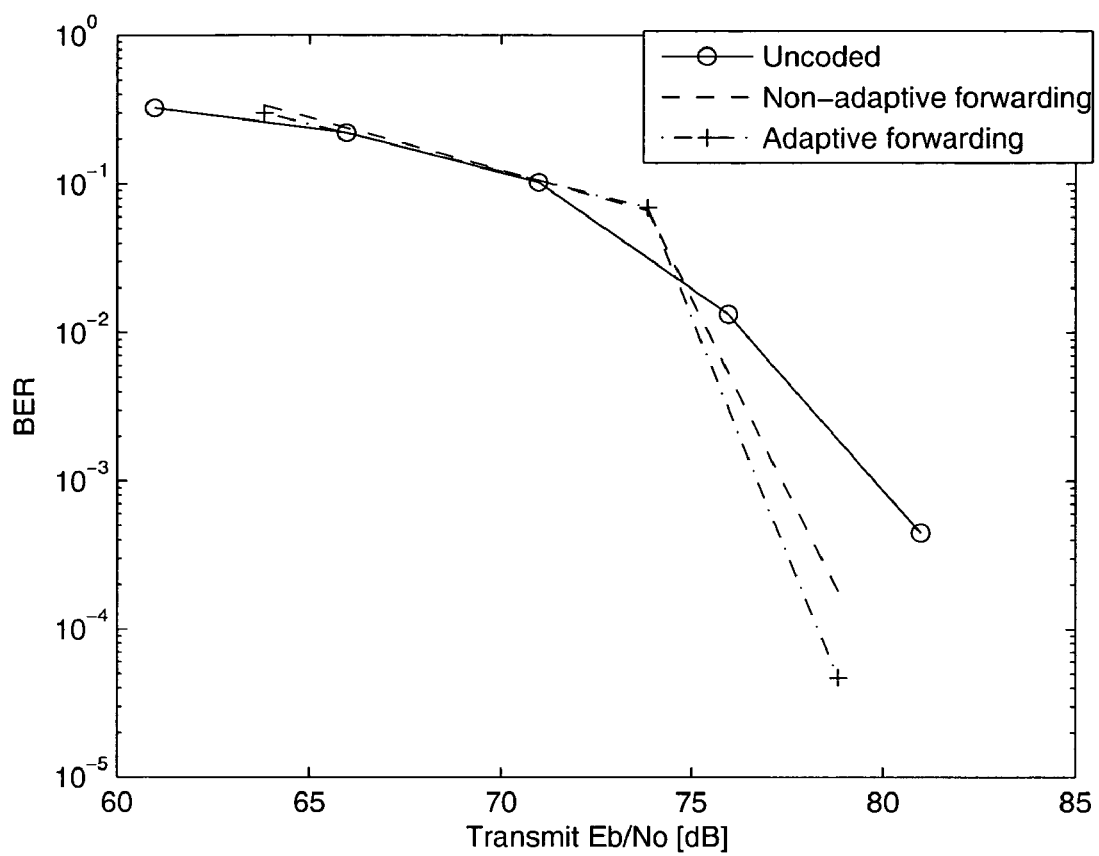
FIG. 6 is a graph illustrating coded BER versus transmit energy per information bit to noise spectral density ratio, $E_b/N_0$; Spectral efficiency=4 bps/Hz, 8 relays and 8 receive antennas at the destination, $d_{S,D}$=100 m, $d_{S,R}$=5 m

FIG. 6 shows the coded BER with and without adaptive forwarding. When adaptive forwarding is employed, errors-and-erasures decoding is used to correct errors and erasures. When adaptive forwarding is not employed (constant forwarding) errors-only decoding is used to correct errors. We assume there are 8 relays and 8 receive antennas at the destination. We find that the adaptive forwarding provides a higher diversity gain (higher slope) and provides 1 dB gain over non-adaptive forwarding at BER value of $10^{-4}$. Because of the higher slope, the gain will be even higher at lower BER.

Figure 7:
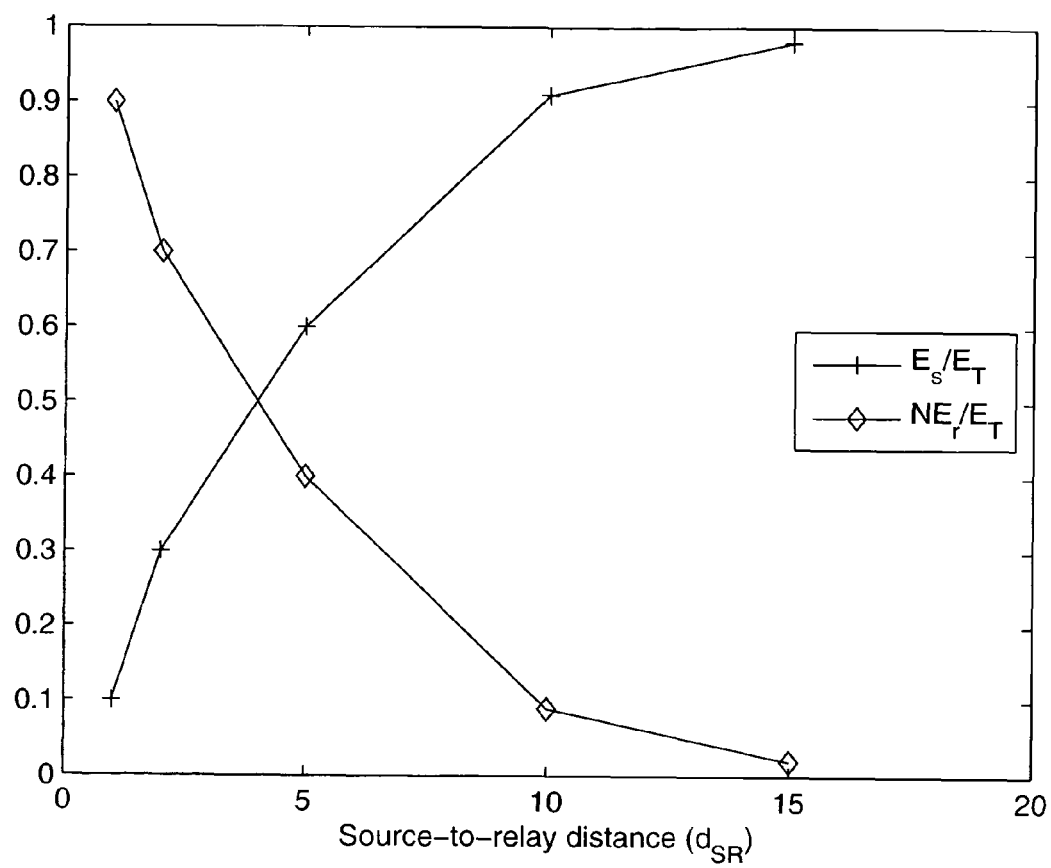
FIG. 7 is a graph illustrating an optimum energy allocation; spectral efficiency=4 bps/Hz, $E_T/N_0$=60 dB, ZF, LLR-ordered SIC, $d_{S,D}$=20 m, path loss exponent=4, BPSK+BPSK, according to one embodiment of the present invention.

FIG. 7 shows the optimum energy allocation for the source and relays that minimizes the end-to-end BER versus the distance between the source and relay for BPSK+BPSK type C-SM with LLR-ordered SIC, where $E^T=E_S+NE_r$ is the total transmit energy per symbol (bit). We find that as the relay moves away from the source $E_S$ should be increased in order to maintain a desirable reliability at the relays.

Figure 8:
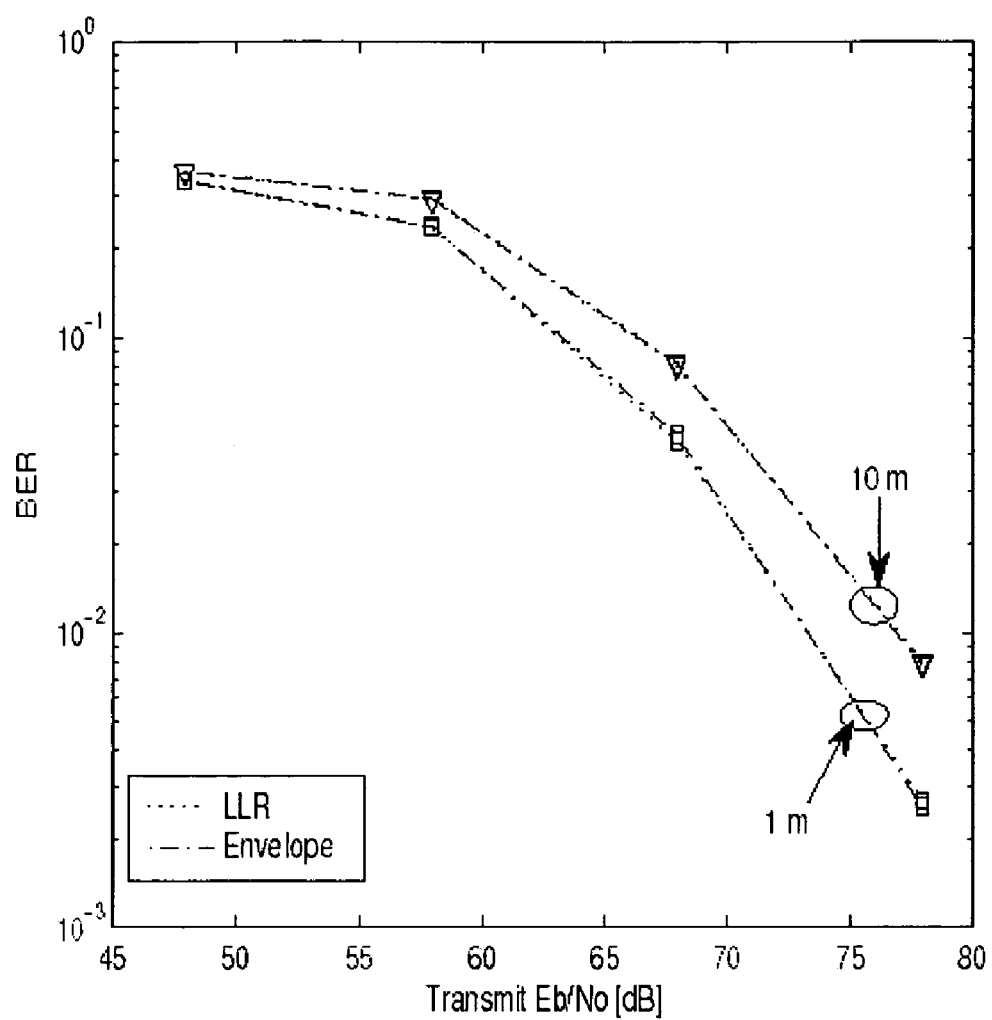
FIG. 8 is a graph illustrating a comparison of ENV-ordered SIC and LLR-ordered SIC in cooperative spatial multiplexing scheme; 4×4, QPSK+QPSK, $d_{S,D}$=20 m, according to one embodiment of the present invention.
Figure 9:
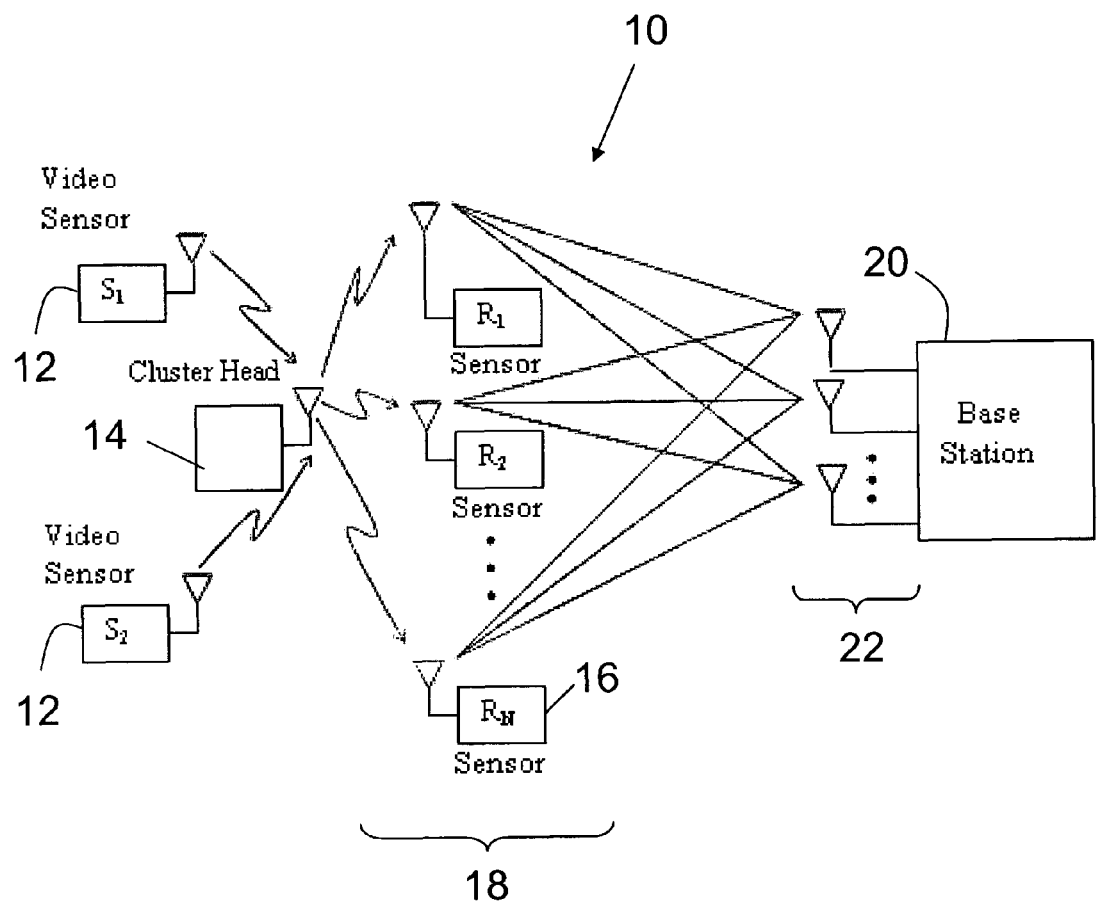
FIG. 9 provides a block diagram of one embodiment of a wireless video sensor network.
Figure 10:
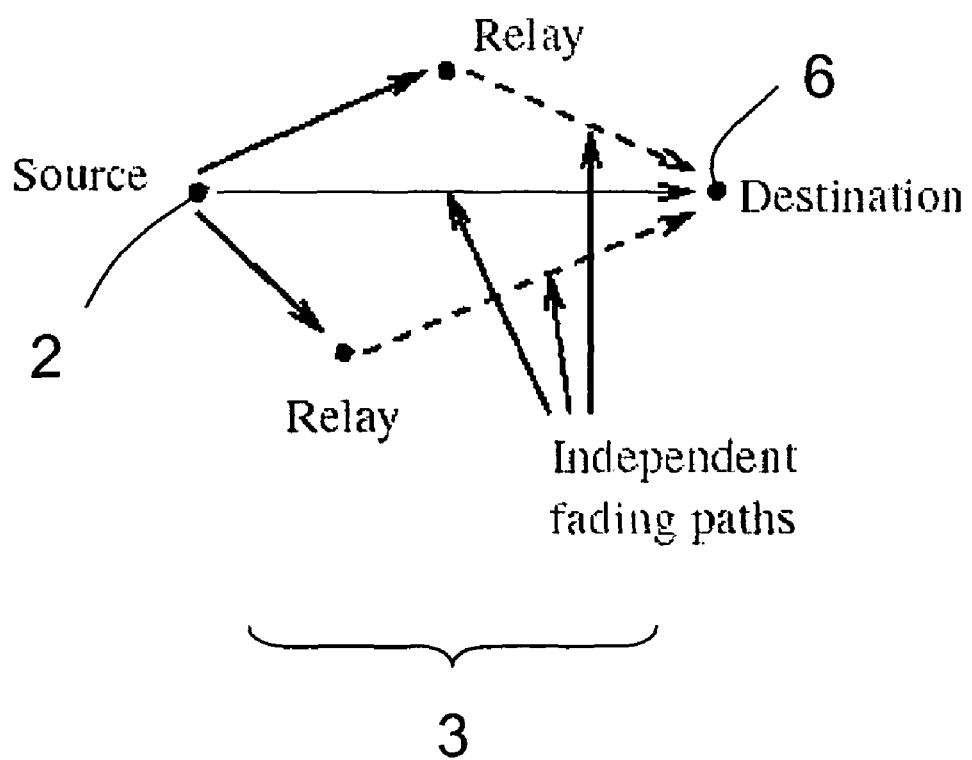
FIG. 10 is a block diagram illustrating cooperative communications.

FIG. 8 compares the BER obtained by the envelope (ENV)-ordered SIC and The LLR-ordered SIC for QPSK+QPSK. We find that the performance of the ENV-ordered SIC is almost identical to that of the LLR-ordered SIC. Since the envelope ordering is much simpler than the LLR ordering, the ENV-ordered SIC seems to be practically optimal.

Thus a new cooperative relaying architecture has been disclosed, called cooperative spatial multiplexing, that simplifies the transmit and receive processing requirement on the relay node while providing significant savings in the transmit and receive energy over the cooperative diversity approach. The basic idea is to shift the burden of the relay nodes to the more resource abundant destination while keeping the relay nodes as simple as possible. The BER and spectral efficiency of the architecture have been presented as a function of several design parameters, such as the constellation size of the source and relays, number of relays and their locations, and power allocation between source and relays. The proposed architecture is particularly attractive in sending high-rate data streams using multiple relays, where each relay node can handle only low-rates due to limited resources in terms of energy, bandwidth computation power, hardware, and space. The reduction in required transmit power results in a reduction of interference to other nodes, leading to a capacity increase, and a coverage extension, leading to a reduction of the number of hops to the destination.

Thus, the present invention provides for a cooperative spatial multiplexing scheme in which the transmitter, equipped with a single antenna, forms virtual antenna arrays from a collection of distributed antennas belonging to different wireless terminals, and transmit high information rate signal to those terminals (relays). Each relay detects the data and forwards its estimation (hard decision) to the receiver (destination). The receiver nulls and cancels the interference from several relays in order of the magnitude of log-likelihood ratio and detects the signal transmitted from the transmitter (source). Unlike the conventional spatial multiplexing scheme, the proposed scheme does not require multiple antennas at the transmitter side, so it is particularly useful for uplink (node to base-station) data transmissions.

The distinctive benefits of the proposed architectures are the following:

The transmit and receive hardware processing requirements on the relay nodes can be reduced, because each relay needs to detect and forward only a fraction of the source data stream.

Lowering the transmission rate (or constellation size) per relay node can reduce the transmit energy requirement at the relay node, because the required bit energy for a given bit error rate (BER) decreases with decreasing constellation size. The reduction of required transmission energy permits economical design of the amplifier used on the relay nodes. For the same transmit energy, the proposed architecture can extend the coverage, and consequently reduce the number of hops to the final destination.

The receive energy consumption at the relay node can also be reduced, because each relay node needs to receive for only 1/N-th of the time and can shut down the receiver in other durations. Energy saving on each relay node can prolong the battery life of the nodes and the life time of the network.

All these will allow the relay nodes to consume less energy, require less complex hardware, and generate less interference to other nodes in the network. Therefore, the proposed architecture can provide a viable solution for delivering high-rate video data in wireless sensor networks, even when each relay node can handle only low-rates due to limited resources in terms of energy, hardware, and space (size).

When a relay node fails, only the sub-stream carried by the failed node needs to be retransmitted, instead of the entire sub-streams. This has a great potential to significantly increase the overall throughput with less energy consumption.

Transmitter Architecture

Because of the practical difficulty associated antenna coupling, the data symbol (stream) will be sent in two steps. In the first step, the source broadcasts a $2^N$-ary symbol x (representing N information bits $x_1, x_2, \ldots, x_N$) at a rate of 1/T symbols per second to N relays (if the relays employs an M-ary signaling, then the required number of relays is $N/\log_2 M$). When the relays are located close to the source, the path loss is small and the radio link may exhibit good line of sight conditions. These will make it possible for the relays to detect high order constellation symbols. However, when the relays are located far away from the source, the constellation size of the source would have to be reduced in order to maintain a desired reliability of detection at the relay. We will consider both cases of binary and non-binary signaling at the source. In the second step, two types of cooperative relaying architectures are contemplated.

Figure 11:
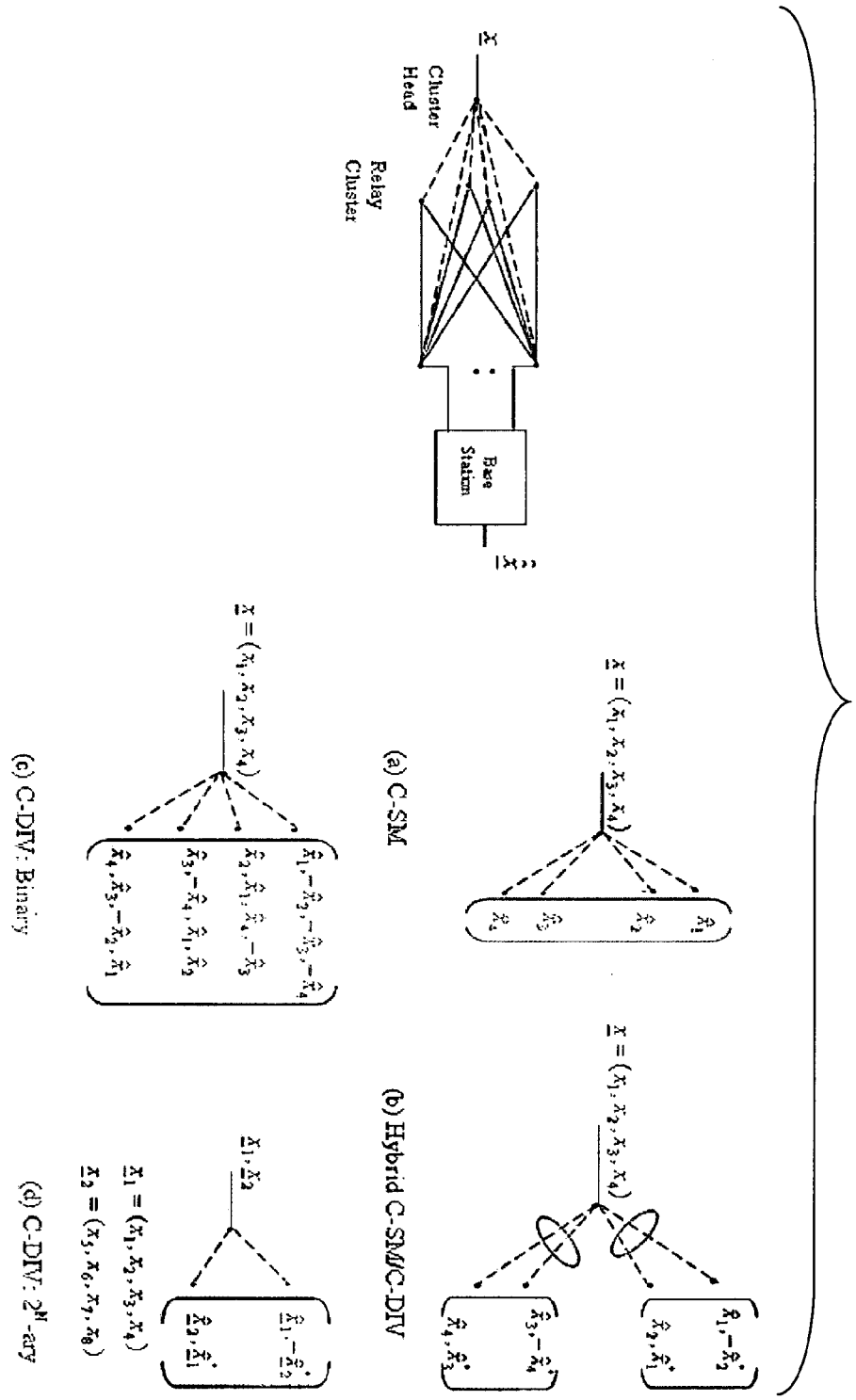
FIG. 11 is a block diagram illustrating cooperative relaying architectures where N=4.

With the cooperative spatial multiplexing (C-SM) architecture, illustrated in FIG. 11, each relay detects only 1/N-th of x (called sub-stream) and all relays forward their low-rate sub-streams simultaneously to the destination over the same physical channel. For example, the i-th relay detects $x_i$ and forwards $\hat{x}_i$ only, where $\hat{x}_i$ is the estimate of $x_i$ at the i-th relay. Then, since N bits are transmitted over 2T seconds, the overall spectral efficiency is N/2 bps/Hz. As shown in FIG. 11, a cluster head 14 is in wireless communication with a relay cluster 18 which is in wireless communication with a base station 20.

The C-SM architecture can be extended to combine with the CDIV architecture by partitioning a set of relays into several groups and forming a distributive space-time block code (STBC) within each group, as illustrated in FIG. 11. The general framework of this hybrid architecture can be regarded as an extension of both C-SM and CDIV, and can serve as a general architecture for designing new cooperative communication strategies with new perspectives. In this hybrid C-SM/C-DIV approach, N relays are partitioned into G groups, $1 \leq G \leq N$, and each group, consisting of N/G relays, forms a N/G×N/G distributive space-time block coding. For example, when G=2, the first relay node forwards $\hat{x}_1, \hat{x}^*_z$ only. Then, since N bits are transmitted over (1+N/G)T seconds, the spectral efficiency of the hybrid approach is N/(1+N/G) bps/Hz. This hybrid approach, which combines the benefits of C-SM (G=N) and C-DIV (G=1), provides a natural and low complex physical layer way to effectively adapt to the diverse communication needs of the emerging wireless multimedia sensor networks, featuring diverse traffic types and performance requirements.

The present invention further contemplates taking advantage of lowering reception and transmission rate per relay node by distributing the traffic over several relay nodes. By lowering the reception rate one can reduce the receive hardware complexity and the energy consumption on the relay nodes. For example, when the source transmits N bits in serial in the C-SM architecture, each relay node needs to receive for only 1/N-th of the time and can shut down the receiver in other durations.

Also, use of low order constellation size (low-rate transmission) at the relay node can reduce the required transmission power or extend the link distance (coverage) for the same transmission power. This follows from the relationship between the received signal-to-noise ratio (SNR), $E_{b_r}/N_0$, that governs the BER and several design parameters, namely $$E_{b_r}/N_0 = d^{-m} PT/(N_0 \log_2 M)$$

where d is the link distance, m is the path loss exponent, P is the transmission power, $N_o$ is the noise power spectral density, and M is the constellation size of the relay. Hence, once all other parameters have been fixed, it is possible to reduce the required transmission power by reducing the constellation size while keeping $E_{b_r}/N_0$ unchanged. Furthermore, the required $E_{b_r}/N_0$ for a given BER can be reduced by using a lower order constellation size. This would further reduce the required transmission power or extend the coverage.

If the C-DIV employs a binary signaling at the relays and N relays form a N×N distributive space-time block coding, as illustrated in FIG. 11, then N bits are transmitted over (1+N)T seconds, providing a spectral efficiency of N/(N+1) bps/Hz. In this case, the C-SM can provide a spectral efficiency gain of (N+1)/2 over the CDIV. However, if $2^N$-ary signaling is employed at the relay, as illustrated in FIG. 11, then the spectral efficiency is N/2 bps/Hz. In either case, however, the C-DIV needs to detect and forward all N bits (full rate) at each relay, thereby requiring more hardware and energy consumptions.

If the source transmits N bits in serial, then the spectral efficiencies of the C-DIV, C-SM, and hybrid C-SM/C-DIV are ½, N/(N+1), and G/(G+1), respectively, all in bps/Hz. In general, if the source constellation size is M, then N bits can be transmitted from the source in $(N/\log_2 M)T$ seconds. As a result, the spectral efficiencies of the C-DIV, C-SM, and hybrid C-SM/C-DIV are $\log_2 M/(1+\log_2 M)$, $N \log_2 M/(N+\log_2 M)$, and $G \log_2 M/(G+\log_2 M)$, respectively.

Receiver Architecture

For the C-SM architecture, the sub-streams can be separated based on their spatial characteristics or the spreading codes if direct sequence spread spectrum (DS-SS) signaling is used. Separation of sub-streams based on spatial characteristics can be made by a number of different receiver algorithms. The maximum likelihood (ML) receiver minimizes the BER, but the complexity becomes prohibitive when there are many relays or the constellation size is large. Minimum mean-square error (MMSE) receiver [13] or zero forcing (ZF) combined with successive interference cancellation (SIC) receiver [14] offers a significant computational reduction and is more practical in systems with large numbers of relays and receive antennas. However, the performance is affected by the order in which the sub-streams are cancelled [11]. The original method detects the sub-stream that presents the maximum SNR first and then cancels its contribution from the received signal. For the remaining symbols, the above process is repeated by detecting the next strongest, and so on.

For this embodiment, the approach for determining the order of cancellation will be based on the magnitude of log-likelihood ratio (LLR). The motivation for using the LLR magnitude is that it provides the reliability of maximum a posteriori (MAP) decision: LLR values near zero correspond to unreliable bits. For binary signaling, the BER for the i-th sub-stream after knowing the nulling filter output $y_i$, $P(\hat{x}_i \neq x_i | y_i)$, is given by $$P(\hat{x}_i \neq x_i \mid y_i) = \frac{1}{1 + e^{|\Lambda(y_i)|}}$$

where $$\Lambda(y_i) = \ln \frac{Pr(x_i = +1 \mid y_i)}{Pr(x_i = -1 \mid y_i)}$$

is the LLR for $x_i$ given $y_i$. Since the BER decreases with increasing $|\Lambda(y_i)|$, the error propagation due to an incorrect cancellation can be minimized by detecting (and canceling) the sub-stream that provides the largest $|\Lambda(y_i)|$ first.

The inventor has tested the idea of ordering based on the LLR magnitude in the vertical Bell Labs layered space-time system (V-BLAST), and results are reported in [15]. It is found that the LLR-based ordering provides a power gain of 5 dB over the conventional SNR-based ordering when the number of transmit and receive antennas is 4, and the power gain increases with increasing number of antennas.

For the hybrid relaying approach, interference can be cancelled in groups and then each signal within a group can be detected by linear combining and ML decoding. Due to the orthogonal nature of the space-time block code, the minimum number of receive antennas needs to equal only the number of groups (layers) [45].

Results and Discussion

Figure 12:
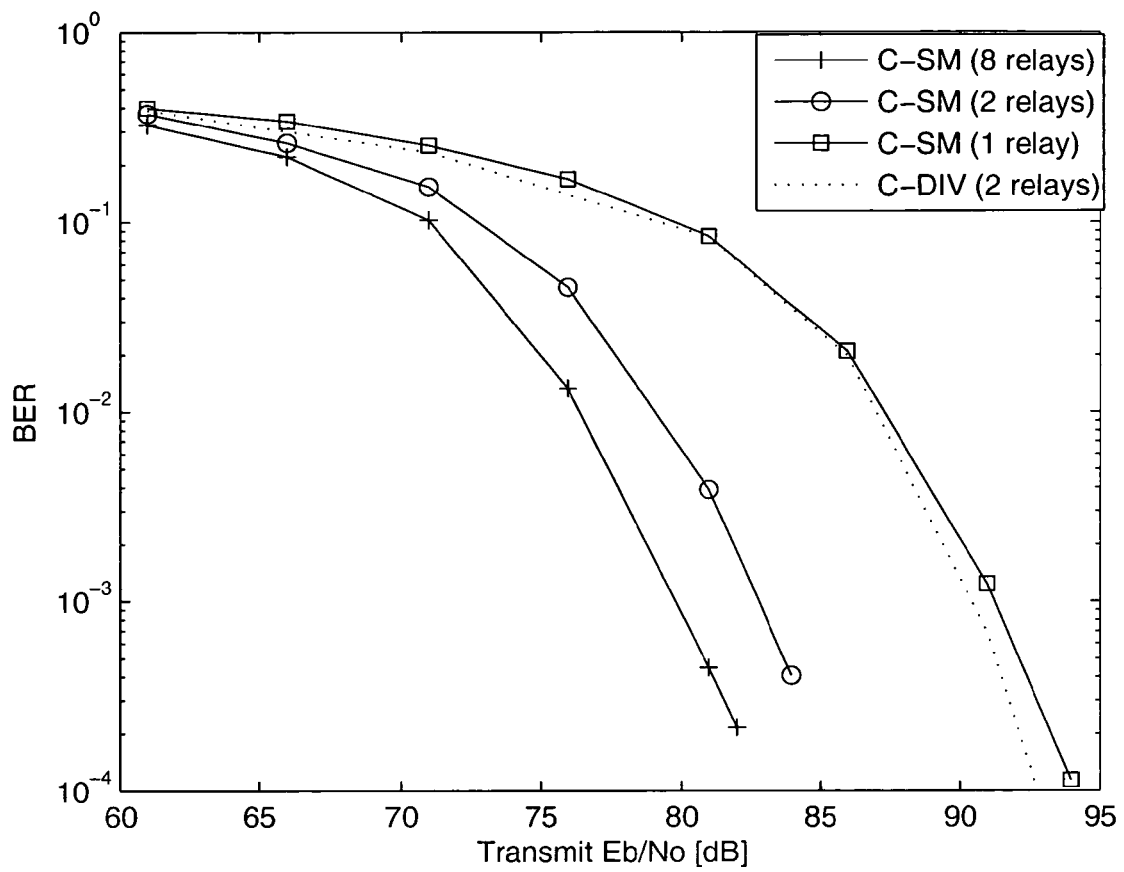
FIG. 12 is a graph illustrating BER versus total transmit energy per information bit to noise spectral density ratio where spectral efficiency=4 bps/Hz, path loss exponent=4.

FIG. 12 compares the end-to-end BER of the C-SM and C-DIV relaying architectures, both providing a spectral efficiency of 4 bps/Hz and employing 8 receive antennas at the destination, in frequency nonselective Rayleigh fading channel. The distance between source and destination is 100 m and the distance between source and relays is 1 m. At the source, both C-SM and C-DIV employ $2^8$-ary QAM signaling. At the relay, the C-SM employs BPSK (8 relays) or 16-QAM (2 relays), whereas the C-DIV forms Alamouti-type space-time encoding with $2^8$-ary QAM at the relay (FIG. 11). The C-SM employs MMSE detection with LLR-ordered successive interference cancellation, whereas the C-DIV employs linear combining and ML detection. The BER for the C-DIV is obtained assuming that the same decision is made in all relays. However, in practice, each relay will make an independent decision, causing an inter-symbol interference when different decisions are made at different relay nodes. Therefore, the BER shown for the C-DIV is a lower bound. FIG. 4 indicates that the proposed C-SM can provide a significantly lower BER than the existing C-DIV for a given $E_b/N_0$ where $E_b$ is the total transmit energy from both source and relays per information bit. Hence, for the same BER the required transmit $E_b/N_0$ can be significantly reduced (10 dB at BER of $10^{-6}$) or the link distance can be significantly increased (coverage extension) for the same transmit energy. The reduction of required transmission energy produces less interference to other sources in the network, which leads to a capacity increase while prolonging the battery life and permitting economical design of the amplifier used on the relay nodes.

The present invention thus also provides for wireless video sensor networks and may have a profound impact on emerging wireless multimedia sensor networks that will be applicable to a wide range of applications, including surveillance and security, health and environmental monitoring.

Therefore, a preferred embodiment for the present invention has been described. The present invention contemplates numerous variations in the specific methodology and structures used, including variations in the type of modulation, variations in the type of encoding, variations in the specific physical structures and configurations, and other variations as will be apparent to one skilled in the art having the benefit of this disclosure. These and other variations are all within the broad spirit and scope of the invention. The present invention is not to be limited to the specific embodiments or disclosure provided here.

REFERENCES

All references listed here and/or cited throughout are hereby incorporated by reference in their entirety.

[1] R. Pabst, et al., "Relay-based deployment concepts for wireless and mobile broadband radio, "*IEEE Communications Magazine*, pp. 80-89, Volume: 42, Issue: 9, September 2004.

[2] A. Nosratinia, et al., "Cooperative communication in wireless networks", *IEEE Communications Magazine*, pp. 74-80, October 2004.

[3] A. Sendonaris, E. Erkip, and B. Azhang, "Increasing uplink capacity via user cooperation diversity," *Proc. IEEE ISIT*, Cambridge, Mass., pp. 156, August 1998.

[4] R. U. Nabar, H. Bolcskei, and F. W. Kneubuhler, "Fading relay channels: performance limits and space-time signal design," *IEEE Journ. On Selected Areas in Commun.*, pp. 1099-1109, August 2004.

[5] J. N. Laneman and G. W. Women, "Distributed space-time coded protocols for exploiting cooperative diversity in wireless networks", *IEEE Tr. On Infor. Theory*, pp. 2415-2425, October 2003.

[6] P. A. Anghel, G. Leus, and M. Kaveh, "Relay assisted uplink communications over frequency-selective channels," *Proc. of SPAWC* 2003, June 2003.

[7] S. Barbarossa, G. Scutari, "Cooperative diversity through virtual arrays in multihop networks," *Proc. IEEE ICASSP*, April 2003.

[8] A. Ribeiro, X. Cai, and G. B. Giannakis, "Symbol error probabilities for general cooperative links," *Proc. of IEEE ICC*, pp. 3369-3373, June 2004.

[9] A. Host-Madsen, "On the capacity of eireless relaying," *Proc. Of IEEE Veh. Tech. Conf.*, pp. 1333-1337, Vancouver, September 2002.

[10] S. Cui and A. J. Goldsmith, "Energy-efficiency of MIMO and cooperative MIMO techniques in sensor networks," *IEEE Journ. on Selected Areas in Commun.*, pp. 1-10, 2004.

[11] G. D. Golden, G. J. Foschini, R. A. Valenzuela, and P. W. Wolniansky, "Detection algorithm and initial laboratory results using the V-BLAST spacetime communication architecture," *Electron. Lett.*, vol. 35, no. 1, pp. 1415, 1999.

[12] A. Chandrakasan, et al., "Design considerations for distributed microsensor systems", *Proc. IEEE Custom Integrated Circuits Conf.*, pp. 279-286, May 1999.

[13] B. A. Bjerke and J. G. Proakis, "Multiple-antenna diversity techniques for transmission over fading channels", *IEEE Wireless Communications and Networking Conference*, pp. 1038-1042, September 1999.

[14] G. J. Foschini, "Layered space-time architecture for wireless communication in a fading environment when using multiple antennas," *Bell Labs Technical Journal*, vol. 1, no. 2, pp. 41-59, 1996.

[15] S. W. Kim, "Log-likelihood ratio based detection ordering for the V-BLAST," *IEEE Globecom*, pp. 292-296, December 2003.

[16] Stephen B. Wicker, Error Control Systems for Digital Communication and Storage, Prentice-Hall, New Jersey, 1995.

[17] M. K. Simon and S. Dolinar, "Improving signal-to-noise ratio estimation for autonomous receivers", IPN Progress Report 42-159, JPL, Nov. 15, 2004.

[18] I. Akyildiz, et al., "A survey on sensor networks," *IEEE Commun. Mag.*, pp. 102-114, August 2002.

[19] C-Y. Chong and S. P. Kumar, "Sensor networks: Evolution, opportunities, and challenges," *Proc. of IEEE*, pp. 1247-1256, August 2003.

[20] P. Jianping, Y. T. Hou, C. Lin, S. Yi, S. X. Shen, "Locating base-stations for video sensor networks," *IEEE Vehicular Technology Conference*, 2003, pp. 3000-3004, October 2003.

[21] R. Holman, J. Stanley, T. Ozkan-Haller, "Applying video sensor networks to nearshore environment monitoring," *IEEE Pervasive Computing*, Volume: 2, Issue: 4, pp. 14-21, Oct.-December 2003.

[22] C. Intanagonwiwat, D. Estrin, R. Govindan, and J. Heidemann, "Impact of Network Density on Data Aggregation in Wireless Sensor Networks," *Proc. Int'l Conf. Distributed Computing Systems (ICDCS)*, July 2002.

[23] B. Krishanamachari, D. Estrin, and S. Wicker, "The impact of data aggregation in wireless sensor networks," *Proc. Int'l Workshop Distributed Event Based Systems (DEBS)*, July 2002.

[24] G. J. Foschini and M. J. Gans, "On limits of wireless communications in a fading environment when using multiple antennas," *Wireless Personal Commun.*, vol. 6, pp. 311-335, March 1998.

[25] Paulraj and C. B. Papadias, "Space time processing for wireless communications," *IEEE Signal Processing Mag.*, vol. 14, pp. 4983, November 1997.

[26] D. Gesbert, M. Shafi, D. Shiu, P. J. Smith, A. Naguib, "From theory to practice: An overview of MIMO space-time coded wireless systems," *IEEE Journal on Selected Areas in Communications*, pp. 281-302, April 2003.

[27] A. F. Molish and M. Z. Win, "MIMO systems with antenna selection," *IEEE Microwave Magazine*, pp. 46-56, Volume: 5, Issue: 1, March 2004.

[28] A. J. Paulraj, et al., "An overview of MIMO communications—a key to gigabit wireless," *Proceedings of the IEEE*, pp. 198-218, Volume: 92, Issue: 2, February 2004.

[29] S. M. Alamouti, "A simple transmitter diversity scheme for wireless communications," *IEEE J. Select. Areas Commun.*, vol. 16, pp. 1451-1458, Oct. 1998.

[30] V. Tarokh, N. Seshadri, and A. R. Calderbank, "Space-time codes for high data rate wireless communication: Performance criterion and code construction," *IEEE Trans. Inf. Theory*, vol. 44, no. 2, pp. 744-765, March 1998.

[31] A. Sendonaris, E. Erkip, and B. Azhang, "User cooperation diversity—Part I: System description," *IEEE Tr. on Commun.*, pp. 1927-1938, November 2003.

[32] A. Sendonaris, E. Erkip, and B. Azhang, "User cooperation diversity—Part Implementation aspects and performance analysis," *IEEE Tr. on Commun.*, pp. 1939-1948, November 2003.

[33] J. N. Laneman, G. W. Wornell, and D. N. C. Tse, "An efficient protocol for realizing cooperative diversity in wireless networks," *Proc. IEEE ISIT*, Washington, D.C., p. 294, June 2001.

[34] T. E. Hunter and A. Nosratinia, "Cooperative diversity through coding," *Proc. IEEE ISIT*, Lausanne, Switzerland, p. 220, June 2002.

[35] A. Host-Madsen, "On the capacity of wireless relaying," *Proc. of IEEE Veh. Tech. Conf.*, pp. 1333-1337, Vancouver, September 2002.

[36] M. Gastpar, G. Kramer, and P. Gupta, "The multiple relay channel: coding and antenna clustering capacity," in *Proc. IEEE ISIT*, pp. 136, Lausanne, Switzerland, July 2002.

[37] P. A. Anghel, G. Leus and M Kaveh, "Multi-user space-time coding in cooperative networks," *Proc. IEEE International Conf. Acoustics, Speech and Signal Processing* (ICASSP 2003), vol. 4, April 2003.

[38] A. Stefanov and E. Erkip, "Cooperative space-time coding for wireless networks," *IEEE Information Theory Workshop*, April 2003.

[39] J. N. Laneman, D. N. C. Tse, and G. Women, "Cooperative diversity in wireless networks: Efficient protocols and outage behavior," To be published in *IEEE Transactions on Information Theory*.

[40] Boyer, J.; Falconer, D.; Yanikomeroglu, H., "Multihop diversity in wireless relaying channels," pp 1820-1830, *IEEE Transactions on Communications*, October 2004.

[41] Embedded Everywhere; A Research Agenda for Networked Systems of Embedded Computers, The National Academies Press, 2001.

[42] Special Issue on Advances in Mobile Ad Hoc Networking, *IEEE Pers. Commun.*, vol. 8, February 2001.

[43] A. Ephremides, "Energy concerns in wireless networks," *IEEE Wireless Commun.*, pp. 48-59, August 2002.

[44] O. Benali, et al., "A framework for an evolutionary path toward 4G by means of cooperation of networks," *IEEE Communications Magazine*, pp. 82-89, May 2004.

[45] A. E. Naguib, N. Seshadri, and A. R. Calderbank, "Space-time coding and signal processing for high data rate wireless communications," *IEEE Signal Processing Mag.*, pp. 76-92, May 2000.

[46] Physical Layer Standard for CDMA2000 Spread-Spectrum Systems, Release C, TIA/EIA/IS-2000.2-C, May 2002.

[47] Wideband CDMA One Radio Transmission Technology Proposal, ITU, *TIA CDMA 2000*, 2000.

[48] R. T. Derryberry et al., "Transmit diversity in 3G CDMA systems," *IEEE Commun. Mag.*, pp. 68-75, April 2002.

[49] A. Mantravadi, V. Veeravalli, and H. Viswanathan, "Spectral efficiency of MIMO multi-access systems with single-user decoding," *IEEE JSAC*, pp. 382-394, April 2003.

[50] I. Oppermann, "CDMA space-time coding using an LMMSE receiver," in *Proc. of IEEE ICC*, pp. 182-187, June 1999.

[51] W. G. Phoel and M. L. Honig, "Transmitter diversity for DS-CDMA with MMSE decision feedback," in *Proc. of IEEE Globecom*, pp. 133-13'7, San Francisco, November 2000.

[52] A. J. Goldsmith and S. B. Wicker, "Design challenges for energy-constrained ad hoc wireless networks," *IEEE Wireless Communications*, vol. 9, Issue: 4, pp 8-27, August 2002.

[53] W. Stark, H. Wang, A. Worthen, S. Lafortune, D. Teneketzis, "Low-energy wireless communication network design," *IEEE Wireless Communications*, pp. 60-72, August 2002.

[54] S. Shakkottai, T. S. Rappaport, P. C. Karlsson, "Cross-layer design for wireless networks," *IEEE Commun. Magazine*, vol. 41, Issue. 41, pp. 74-80, October 2003.

[55] C. Comaniciu and H. V. Poor, "Joint optimal power and admission control for delay sensitive traffic in CDMA networks with LMMSE receivers," *IEEE Tr. Signal Processing*, pp. 2031-2042, August 2003.

[56] Maharshi, L. Tong, and A. Swami, "Cross-layer designs of multichannel reservation MAC under Rayleigh fading," *IEEE Tr. Signal Processing*, pp. 2054-2067, August 2003.

[57] R. Gozali, R. M. Buehrer and B. D. Woerner, "The impact of multiuser diversity on space-time block coding," *IEEE Comm. Letters*, pp. 213-215, May 2003.

[58] D. Aktas and H. El Gamal, "Multiuser scheduling for multiple antenna systems," *IEEE Pacific Rim Conf. on Communications, Computers and signal processing*, vol. 1, August 2003.

[59] R. W. Heath Jr., M. Airy and A. J. Paulraj, "Multiuser diversity for MEMO wireless systems with linear receivers," *IEEE Conf Signals, Systems and Computers*, vol. 2, pp. 1194-1199, November 2001.

[60] H. Viswanathan and Venkatesan, "The impact of antenna diversity in packet data systems with scheduling," *IEEE Trans. on Commun.*, pp. 546-549, Volume: 52, Issue: 4, April 2004.

[61] D. Piazza and L. Milstein, "Multiuser diversity-mobility tradeoff: modeling and performance analysis of a proportional fair scheduling," in *Proc. IEEE Global Telecommun.* (Globecom '02), Taipei, Taiwan, vol. 1, pp. 906-910, November 2002.

[62] N. B. Mehta, Z. A. Kostic and M. Z. Win, "Interaction between fast scheduling diversity and rake receivers," *Proc. of IEEE Vehicular Technology Conf*, pp. 1464-1468, April 2003.

[63] D. Gesbert and M.-S. Alouini, "Selective multi-user diversity," in *Proc. IEEE International Symposium on Signal Processing and Information Technology*, pp. 162-165, December 2003.

[64] H. V. Poor, "Turbo multiuser detection: An overview," *IEEE Inter. Symposium on Spread-Spectrum Tech. & Appli.*, pp. 583-587, September 2000.

[65] J. Hagenauer, "The turbo principle: tutorial introduction and state of the art," in *Proc. $1^{st}$ Int. Symp. Turbo Codes*, pp. 1-12, September 1997.

[66] H. V. Poor, "Iterative multiuser detection," *IEEE Signal Processing Magazine*, Volume: 21, Issue: 1, Pages: 81-88, January 2004.

[67] S. Sfar, R. D. Murch., and K. B. Letaief, "Layered space-time multiuser detection over wireless uplink systems," *IEEE Transactions on Wireless Communications*, Volume: 2, Issue: 4, Pages: 653-668, July 2003.

[68] F. Bandiera, G. Ricci, and M. K. Varanasi, "Blind multiuser detection over highly dispersive CDMA channels," *IEEE Transactions on Communications*, Volume: 52, Issue: 8, Pages: 1377-1387, August 2004.

[69] C. B. Papadias and A. J. Paulraj., "Space-time signal processing for wireless communications: a survey," *First IEEE Signal Processing Workshop on Signal Processing Advances in Wireless Communications*, pp. 285-288, Apr. 16-18, 1997.

[70] H. Viswanathan, S. Venkatesan, and H. Huang, "Downlink capacity evaluation of cellular networks with known-interference cancellation," *IEEE Journal on Selected Areas in Communications*, Volume: 21, Issue: 5, Pages: 802-811, June 2003.

[71] J. G. Andrews and T. H. Meng, "Optimum power control for successive interference cancellation with imperfect channel estimation," *IEEE Transactions on Wireless Communications*," Volume: 2, Issue: 2, Pages: 375-383, March 2003.

What is claimed is:

1. A method for cooperative spatial multiplexing, comprising:
    broadcasting from a source a source data stream to a plurality of relay nodes;
    detecting at each of the relay nodes a different substream of the source data stream, each substream being a portion of the source data stream;
    simultaneously forwarding the detected substream from each relay node to a destination over a physical channel;
    receiving at the destination, the detected substream from each relay node; and
    recovering the source data stream from the detected substream from each relay node.

2. The method of claim 1 wherein the step of receiving being performed by multiple receive antennas.

3. The method of claim 1 wherein the step of recovering comprises reassembling the detected substreams to provide the source data stream.

4. The method of claim 3 wherein the reassembly being based on spatial characteristics of the detected substream from each relay node.

5. The method of claim 3 wherein the reassembly being based on spreading codes of the detected substream from each relay node.

6. The method of claim 1 wherein the step of recovering comprises canceling interference associated with receiving the detected substream from each relay node.

7. The method of claim 6 wherein the step of canceling interference includes canceling interference from the relays in order of the magnitude of log-likelihood ratio.

8. The method of claim 1 wherein the step of recovering comprises applying error correction.

9. The method of claim 1 wherein each relay node comprises only one antenna.

10. The method of claim 1 wherein the source comprises only one antenna.

11. The method of claim 1 wherein the source data stream comprises video data.

12. The method of claim 1 wherein a first modulation scheme is used by the source and a second modulation scheme is used by each of the relay nodes, the first modulation scheme different from the second modulation scheme.

13. A wireless communication system comprising:
    a transmitter;
    a plurality of relays in operative communication with the transmitter;
    a receiver in operative communication with each of the plurality of relays; and
    wherein the transmitter, the plurality of relays, and the receiver are adapted for cooperative spatial multiplexing by a method comprising:
      (a) broadcasting from the transmitter a source data stream to the plurality of relay nodes;
      (b) detecting at each of the plurality of relays a different substream of the source data stream, each substream being a portion of the source data stream;
      (c) simultaneously forwarding the detected substream from each of the plurality of relays to the receiver;
      (d) receiving at the receiver, the detected sub stream from each of the plurality of relays; and
      (e) recovering the source data stream from the detected sub stream from each of the plurality of relays.

14. The wireless communication system of claim 13 wherein the transmitter is associated with a clusterhead adapted for performing data aggregation of a plurality of video streams.

15. The wireless communication system of claim 13 wherein each of the plurality of relays comprises a video sensor.

16. The wireless communication system of claim 13 wherein the transmitter is a code division multiple access transmitter and the receiver is a code division multiple access receiver.

17. The system of claim 13 wherein the receiver includes multiple antennas.

18. The system of claim 13 wherein the receiver is adapted to null and cancel interference from the plurality of relays.

19. The system of claim 13 wherein the receiver is adapted to null and cancel interference from the plurality of relays in order of magnitude of log-likelihood ratio.

20. The system of claim 13 wherein a first modulation scheme is used by the transmitter and a second modulation scheme is used by the plurality of relays, the first modulation scheme different from the second modulation scheme.

21. A method for cooperative spatial multiplexing, comprising:
    broadcasting a source stream of data from a source having a single antenna to a plurality of relay nodes and a destination over a communications link;
    detecting at each of the relay nodes one of a plurality of different substreams, each of the relay nodes having only a single antenna and each of the relay nodes detecting a different substream of the source stream of data;
    simultaneously forwarding the detected substream from each relay node to a destination over the same physical channel; and
    recovering at the destination the source data stream from the detected substream from each relay node.

22. The method of claim 21 further comprising receiving the detected substream from each relay node at a receiver at the destination.

23. The method of claim 22 further comprising canceling interference at the destination.

24. The method of claim 23 wherein the step of canceling interference includes canceling interference from the relays in order of the magnitude of log-likelihood ratio.

25. A method for cooperative spatial multiplexing to reduce burdens on a plurality of N relay nodes, comprising:
    broadcasting from a source a $2^N$-ary symbol to the plurality of N relay nodes and a destination over a communications link;
    detecting at each of the relay nodes one of a plurality of different substreams associated with the symbol, each of the relay nodes detecting a different substream of the symbol;
    simultaneously forwarding the detected substream from each relay node to the destination over the same physical channel; and
    recovering at the destination the source data stream from the detected substream from each relay node.

26. The method of claim 25 wherein the source is a transmitter which includes only a single antenna.

27. The method of claim 25 wherein the destination is a receiver which includes multiple receive antennas.

28. The method of claim 25 further comprising receiving the detected substream from each relay node at a receiver at the destination.

29. The method of claim 28 further comprising canceling interference.

30. The method of claim 29 wherein the step of canceling interference includes canceling interference from the relays in order of the magnitude of log-likelihood ratio.

* * * * *